(12) United States Patent
Jochum et al.

(10) Patent No.: US 10,875,948 B2
(45) Date of Patent: Dec. 29, 2020

(54) PEROXIDE CURABLE FLUOROPOLYMERS OBTAINABLE BY POLYMERIZATION WITH NON-FLUORINATED EMULSIFIERS

(71) Applicant: 3M INNOVATIVE PROPERTIES COMPANY, St. Paul, MN (US)

(72) Inventors: Florian D. Jochum, Neuotting (DE); Klaus Hintzer, Kastl (DE); Kai Helmut Lochhaas, Neuotting (DE); Harald Kaspar, Burgkirchen (DE); Tilman C. Zipplies, Burghausen (DE); Helmut Traunspurger, Julbach (DE)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 180 days.

(21) Appl. No.: 15/553,101

(22) PCT Filed: Feb. 22, 2016

(86) PCT No.: PCT/US2016/018845
§ 371 (c)(1),
(2) Date: Aug. 23, 2017

(87) PCT Pub. No.: WO2016/137851
PCT Pub. Date: Sep. 1, 2016

(65) Prior Publication Data
US 2018/0030182 A1    Feb. 1, 2018

(30) Foreign Application Priority Data

Feb. 23, 2015 (EP) ..................... 15156170

(51) Int. Cl.
| | |
|---|---|
| *C08F 214/22* | (2006.01) |
| *C08F 214/28* | (2006.01) |
| *C08F 214/26* | (2006.01) |
| *C08F 259/08* | (2006.01) |
| *C08L 27/16* | (2006.01) |
| *C08L 27/18* | (2006.01) |
| *C08L 27/20* | (2006.01) |

(52) U.S. Cl.
CPC ........ *C08F 214/222* (2013.01); *C08F 214/22* (2013.01); *C08F 214/282* (2013.01); *C08F 259/08* (2013.01)

(58) Field of Classification Search
CPC ........... C08F 214/222; C08F 214/282; C08F 214/22; C08F 259/08; C08F 214/28; C08F 214/26; C08F 214/262; C08L 27/16; C08L 27/18; C08L 27/20
USPC ..................................... 526/247
See application file for complete search history.

(56) References Cited

U.S. PATENT DOCUMENTS

| | | | |
|---|---|---|---|
| 5,380,891 A | 1/1995 | Connor | |
| 8,124,699 B2 | 2/2012 | Durali | |
| 8,158,734 B2 | 4/2012 | Amin-Sanayei | |
| 2007/0015937 A1 | 1/2007 | Hintzer | |
| 2007/0208137 A1* | 9/2007 | Kaspar ............... | C08L 27/16 |
| | | | 525/199 |

FOREIGN PATENT DOCUMENTS

| | | |
|---|---|---|
| EP | 0890592 | 5/2003 |
| EP | 1462461 | 2/2008 |
| EP | 2069407 | 11/2010 |
| EP | 2284200 | 2/2011 |
| EP | 2284200 A1 * | 2/2011 ............ C08F 14/18 |
| EP | 2091978 | 3/2011 |
| EP | 2089462 | 12/2011 |
| EP | 2698390 | 2/2014 |
| EP | 2868674 | 5/2015 |
| EP | 1325036 | 3/2016 |
| GB | 2517481 | 2/2015 |
| JP | 2008-297528 A | 12/2008 |
| WO | WO 98/016561 | 4/1998 |
| WO | WO 2000-035971 | 6/2000 |
| WO | WO 2007-018783 | 2/2007 |

(Continued)

OTHER PUBLICATIONS

Yamak, "Emulsion Po;lymerization: Effects of Polymerization Variables on the Properties of Vinyl Acetate Based Emulsion Polymers", (https://www.intechopen.com/books/polymer-science/emulsion-polymerizationeffects-of-polymerization-variables-on-the-properties-of-vinyl-acetate-based), Jan. 23, 2013 (Year: 2013).*
Auhl, "Molecular Characterization of Semi-Fluorinated Copolymers with a Controlled Amount of Long-Chain Branching" Macromolecules, Feb. 2006, vol. 39, No. 6, pp. 2316-2324.
Geetha, "Alkyl Poly Glucosides (APGs) Surfactants and Their Properties: A Review," Tenside Surfactants Detergents, Sep. 2012, vol. 49, No. 5, pp. 417-427.
International Search Report for PCT International Application No. PCT/US2014/071242, dated Feb. 13, 2015, 4 pages.
International Search Report for PCT International Application No. PCT/US2016/018845, dated May 23, 2016, 5 pages.

*Primary Examiner* — Ronald Grinsted
(74) *Attorney, Agent, or Firm* — Thomas M. Spielbauer

(57) ABSTRACT

Curable fluoropolymer containing repeating units derived from VDF and TFE and at least one other fluorinated comonomer and further containing —$CF_2CH_2I$ end groups and branching sites derived from one or more perfluorinated bisolefinic ether(s) used as modifier(s), wherein the one or more perfluorinated bisolefinic ether(s) used as modifier(s) correspond to the general formula: $CF_2\!=\!CF\!-\!(CF_2)_n\!-\!O\!-\!(R_1)\!-\!O\!-\!(CF_2)_m CF\!=\!CF_2$ wherein n and m are independent from each other either 1 or 0 and wherein $R_1$ represents a perfluorinated linear or branched, cyclic or acyclic aliphatic or aromatic hydrocarbon residue that may be interrupted by one or more oxygen atoms and comprises up to 30 carbon atoms. Further provided are methods of making the curable fluoropolymers and for making an article containing the curable polymers.

20 Claims, No Drawings

(56) References Cited

FOREIGN PATENT DOCUMENTS

| | | | |
|---|---|---|---|
| WO | WO 2008-073686 | 6/2008 | |
| WO | WO 2008-076385 | 6/2008 | |
| WO | WO 2009-126504 | 10/2009 | |
| WO | WO 2010-149262 | 12/2010 | |
| WO | WO 2011/014715 A2 | 2/2011 | |
| WO | WO 2012-018603 | 2/2012 | |
| WO | WO-2012018603 A1 * | 2/2012 | ............ C08F 214/18 |
| WO | WO 2012-049093 | 4/2012 | |
| WO | WO 2012-141129 | 10/2012 | |
| WO | WO 2013-019614 | 2/2013 | |

* cited by examiner

PEROXIDE CURABLE FLUOROPOLYMERS OBTAINABLE BY POLYMERIZATION WITH NON-FLUORINATED EMULSIFIERS

CROSS REFERENCE TO RELATED APPLICATIONS

This application is a national stage filing under 35 U.S.C. 371 of PCT/US2016/018845, filed Feb. 22, 2016, which claims the benefit of European Application No. 15156170.1, filed Feb. 23, 2015, the disclosure of which is incorporated by reference in their entirety herein.

FIELD

The present disclosure relates to methods of making curable fluoropolymers, to fluoropolymers obtained by such methods and their applications.

BRIEF DESCRIPTION

Fluoroelastomers are heat stable and resistant to a wide range of chemical reagents and are widely used for sealing materials, such as O-rings and gaskets. They are also used to make hoses and tubings or as barrier materials for the interior of hoses and tubes. Typically, fluoroelastomers are used in applications where resistance to fuels or lubricants is needed such as components of combustion engines, fuel management systems, oil and gas storage and transportation devices, oil and gas compression or decompression devices and components of sealants, barriers or valves of chemical processing equipment.

Fluoroelastomers are typically obtained by curing (cross-linking) a curable fluoropolymer. To achieve sufficient cross-linking the curable fluoropolymers often contain cure sites, which are reactive groups that can undergo cross-linking reactions in the presence of suitable cross-linking agents. A commercially widely used cure system is based on a peroxide cure reaction using appropriate curing compounds having or creating peroxides, which in turn are believed to generate free radicals. Fluoropolymers suitable for use in peroxide curing systems (peroxide curable fluoroelastomers) contain reactive sites which include bromine or iodine atoms. It is generally believed that the bromine or iodine atoms are abstracted in the free radical peroxide cure reaction, thereby causing the fluoropolymer molecules to cross-link and to form a three dimensional network. The peroxide-reactive groups can be introduced by using suitably functionalized monomers or chain transfer agents.

Peroxide curable fluoropolymers of high quality are most conveniently prepared by aqueous emulsion polymerization using fluorinated emulsifiers. The fluorinated emulsifier of choice has been a perfluorinated carboxylic acid, typically perfluorooctanoic acid. The presence of the fluorinated emulsifiers allows for the preparation of polymers in high yields (high polymer content or solid content) in short run times.

However, most fluoropolymer manufacturers have agreed to phase out the use of perfluorinated emulsifiers like perfluoro octanoic acid. Alternative methods are required that produce fluoroelastomers of high quality in an economical way, for example by using alternative fluorinated emulsifiers or by using polymerizations without adding any fluorinated emulsifier. Alternative fluorinated emulsifiers are typically perfluoro or partially fluorinated ether acids. In Applicant's European patent application EP 2 601 226 A1 a peroxide curable fluoroelastomer is described that can be obtained by a polymerization without using any fluorinated surfactants. The polymerization is carried out in the presence of an unsaturated polyether as a modifier that gets incorporated into the polymer. While suitable elastomers may be obtained by this method there is the need to further improve the properties of fluoroelastomers that are prepared essentially without using fluorinated emulsifiers.

SUMMARY

In one aspect there is provided a curable fluoropolymer containing repeating units derived from VDF and TFE and at least one other fluorinated comonomer and further containing —$CF_2CH_2I$ end groups and branching sites derived from one or more perfluorinated bisolefinic ether modifier, wherein the polymer is obtainable by an aqueous emulsion polymerization comprising the addition to one or more non-fluorinated emulsifier but wherein essentially no fluorinated emulsifier is added and wherein the one or more perfluorinated bisolefinic ether modifier correspond to the general formula:

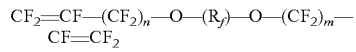

wherein n and m are independent from each ether either 1 or 0 wherein $R_f$ represents a perfluorinated linear or blanched, cyclic or acyclic aliphatic or aromatic hydrocarbon residue that may be interrupted by one or more oxygen atoms and comprises up to 30 carbon atoms.

In another aspect there is provided a cured composition obtained after subjecting the curable fluoropolymer to a curing reaction.

In a further aspect there is provided an article comprising the cured composition.

In yet another aspect there is provided a method of making an article comprising subjecting the curable polymer composition to curing and shaping wherein the shaping may occur after or during the curing.

In a further aspect there is provided a method of making a curable fluoropolymer comprising i) polymerizing VDF, TFE and at least one other comonomer in an aqueous emulsion polymerization in the absence of any added fluorinated emulsifiers but in the presence of a non-fluorinated emulsifier, an iodine-containing chain transfer agent (CTA), one or more perfluorinated bisolefinic ether modifier(s) and, optionally, one or more iodine-containing cures site monomers, wherein the iodine-containing CTA is selected from fluorinated iodo-olefins wherein the olefin chain may be interrupted once or more than once by an other oxygen, and wherein the modifier is selected from perfluorinated bisolefinic ether modifiers corresponding to the general formula:

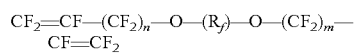

wherein n and m are independent from each other either 1 or 0 and therein $R_f$ represents a perfluorinated linear or branched, cyclic or acyclic aliphatic or aromatic hydrocarbon residue that may be interrupted by one or more oxygen atoms and comprises up to 30 carbon atoms.

In yet a further aspect there is provided a method of making a curable fluoropolymer comprising
i) providing a seed composition obtained by aqueous emulsion polymerization of one fluorinated monomer and at least one other fluorinated comonomer essentially in the absence of a fluorinated emulsifier but in the presence of one or more non-fluorinated saturated emulsifier:

In polymerizing VDF, TFE and at least one other comonomer in an aqueous emulsion polymerization the presence of the seed composition and in the absence of any added fluorinated emulsifiers but in the presence of an iodine-containing chain transfer agent (CTA), one or more perfluorinated bisolefinic ether modifiers) and, optionally, one or more iodine-containing cures site monomers, wherein the iodine-containing CTA is selected from fluorinated iodo-olefins wherein the olefin chain may be interrupted once or more than once by an ether oxygen, and wherein the modifier is selected from perfluorinated bisolefinic ether modifiers corresponding to the general formula:

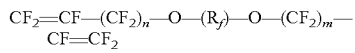
$$CF_2=CF-(CF_2)_n-O-(R_f)-O-(CF_2)_m-CF=CF_2$$

wherein n and m are independent from each other either 1 or 0 and wherein $R_f$ represents a perfluorinated linear or branched, cyclic or acyclic aliphatic or aromatic hydrocarbon residue that may be interrupted by one or more oxygen atoms and comprises up to 30 carbon atoms.

DETAILED DESCRIPTION

Before any embodiments of this disclosure are explained in detail, it is to be understood that the disclosure is not limited in its application to the details of construction and the arrangement of components set forth in the following description. The invention is capable of other embodiments and of being practiced or of being carried out in various ways. Also, it is to be understood that the phraseology and terminology used herein is for the purpose of description and should not be regarded as limiting. The use of "including," "containing", "comprising," or "having" is meant to encompass the items listed thereafter and equivalents thereof as well as additional items. The use of "consisting" is meant to be limiting and to encompass the items listed thereafter and equivalents thereof but no additional items.

The use of "a" or "an" is meant to encompass "one or more". Any numerical range recited herein is intended to include all values from the lower value to the upper value of that range. For example, a concentration range of from 1% to 50% is intended to be an abbreviation and to expressly disclose the values between the 1% and 50%, such as, for example, 2%, 40%, 10%; 30%, 1.5%, 3.9% and so forth.

As used herein above and below the term 'copolymer' means a polymer comprising repeating units derived from the recited monomers (comonomers) without excluding the option of other repeating units being present that derive from other monomers (comonomers) not explicitly recited. The term "bipolymer" is used to indicate the presence of only two comonomers. Other comonomers may only be present if specifically indicated. The term "terpolymer" is used to indicate the presence of only three comonomers. Other comonomers may only be present if specifically indicated. Likewise, the term "quadpolymer" is used to indicate the presence of only four comonomers. Other comonomers may only be present if specifically indicated.

As used herein above and below the term "end group" of a polymer is used for groups that are at the terminal positions of both the polymer backbone chain and the terminal positions of side chains if present.

The polymerization methods provided herein lead to curable fluoropolymers having a high content of iodine end groups. The curable fluoropolymers can be cured to provide elastomers having good mechanical properties and good curing properties, for example improved demolding properties, i.e. the may be easier removed from molds, and in particular may leave fewer residue in the mold. The fluoropolymers provided herein may have a reduced amount of extractable materials believed to be oligomeric material or low molecular weight iodinated material that did not get incorporated into the polymer. It is believed that the polymers obtained by the methods provided herein have a more homogeneous incorporation of the cure sites over the polymer population and a more effective incorporation of iodinated materials into the polymer chains leading to a reduced amount of extractable materials.

Another advantage of the processes and polymers provided herein is that fluoropolymers with a high degree of iodine groups can be prepared. The polymers show a good cross-linkability as expressed by compression set value.

A further advantage of the methods for making polymers provided herein is that polymers can be prepared without using great amounts of fluorinated emulsifiers or using no fluorinated emulsifiers at all. The polymerization may be carried out in the presence of non-fluorinated emulsifiers and or may be carried out by rising a seed composition. The seed compositions may be prepared in the presence of fluorinated emulsifiers and/or in the presence of non-fluorinated emulsifiers. Since only very little amounts of seed composition may be required, the fluoropolymers may be prepared by using no or only very little amounts of fluorinated emulsifiers or non-fluorinated emulsifiers.

Curable and Cured Fluoropolymers

The curable and cured fluoropolymers provided herein contain at least 30% by weight of fluorine, more preferably at least 50% by weight of fluorine, most preferably at least 60% by weight of fluorine, and typically between 58 and 75% by weight of fluorine (based on the total weight of the polymer). The fluorine content may be achieved by selecting the comonomers and their amounts accordingly. It can be determined as nominal fluorine content by determining the amount of monomers and calculating their fluorine content—by excluding contributions to the fluorine content from other components like, for example, cure the monomers and modifier and CTA's.

The fluoropolymers provided herein may be cured (cross-linked) or uncured (non-crosslinked) but curable. Typically, the curable and cured fluoropolymers are amorphous. Typically, they do not have distinct a melting point. Generally, they have a glass transition temperature (Tg) of less than 20° C., preferably less than −20° C. and more preferably less than −30° and most preferably less than −35° C., for example a Tg of between −40° C. and 20° C., or −50° C. and 20° C. or between −55° C. and −20° C. The curable fluoropolymers described herein may typically have a Mooney viscosity (ML 1+10 at 121° C.) of from about 2 to about 150, preferably about 10 to about 100, more preferably from about 20 to about 70.

The curable fluoropolymers are peroxide curable. They contain iodine-containing cure-sites, in particular iodine-containing end groups, but may or may not contain other cure sites.

Comonomers:

The fluoropolymer are copolymers and contain at least one fluorinated comonomer. Preferably, the majority of comonomers by mole (e.g. >50 mole %) are fluorinated comonomers in one embodiment the fluoropolymers contain at least one repeating unit from a partially fluorinated olefin, preferably vinylidenefluoride. Such fluoropolymers are partially fluorinated.

The fluoropolymers presided herein are copolymers and typically contain repeating units derived from perfluorinated and/or partially fluorinated olefins. Preferably they contain repeating units derived from 1,1-difluoroethene (vinylidenefluoride, VDF) and at least one perfluorinated comonomer. The at least one perfluorinated comonomer includes hexafluoropropene (HFP), tetrafluoroethene (TFE), at least one perfluorinated alkyl vinyl ether (PAVE), at least one perfluorinated alky allyl ether (PAAE) and combinations thereof.

The perfluorinated alkyl vinyl and alkyl allyl ethers typically have a general structure according to the formula:

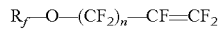

$R_f\!-\!O\!-\!(CF_2)_n\!-\!CF\!=\!CF_2$ wherein n is 1 (allyl ether) or 0 (vinyl ether) and Rf represents a perfluoroalkyl residue which may or may not be interrupted by one or more than one oxygen atoms. Examples of such ethers include but are not limited to perfluoro (methyl vinyl) ether (PMVE), perfluoro (ethyl vinyl) ether (PEVE), perfluoro (n-propyl vinyl) ether (PPVE-1), perfluoro-2-propoxypropylvinyl ether (PPVE-2), perfluoro-3-methoxy-n-propylvinyl ether, perfluoro-2-methoxy-ethylvinyl ether, $CF_3\!-\!(CF_2)_2\!-\!O\!-\!CF(CF_3)\!-\!CF_2\!-\!O\!-\!CF(CF_3)\!-\!CF_2\!-\!O\!-\!CF\!=\!CF_2$ and their allyl ether homologues. Further examples include vinyl ethers of the general formula: $CF_2\!=\!CFOCF_2OR$ wherein R is a $C_2$-$C_6$ linear, branched or cyclic (per)fluoroalkyl group, or a $C_2$-$C_6$ linear, branched (per)fluoro oxyalkyl group containing from one to three oxygen atoms. Specific examples include $CF_2\!=\!CFOCF_2OCF_2CF_2Y$ wherein Y is F or $OCF_3$.

Suitable non-fluorinated comonomers that may be used to make the fluoropolymers according to the present disclosure include alpha olefins like ethene and propene. If non-fluorinated comonomers are used their amount is typically less than 60 mole % or less than 50 mole %. Preferably, when used, they may be present in an amount of from 5 and up to 10 mole %.

The monomers are used in amounts to generate a curable fluoropolymer with the properties described herein, for example having a glass transition temperature (Tg) as described above, for example of less than 20° C. and/or a fluorine content of between 59 and 75% by weight (based on the total weight of the polymer).

In one embodiment the fluoropolymers provided herein contain from about 14 to 80% by weight of VDF units.

In one embodiment the fluoropolymers contain repeating units derived from VDF and HFP. Such polymers may contain from about 14 to about 80% by weight of VDF and 18 to 66% by weight of HFP and from 0 to 68%. For example from about 5 to about 45% by weight, or from about 19 to 55% by weight, of one or more further perfluorinated monomers selected from the perfluorinated allyl or vinyl ethers as described above. The weight percentages are based on the total weight of the polymer and the amounts are selected to give a total of 100% by weight. In a particular embodiment the fluoropolymers are bipolymers of VDF and HFP but may additional contain cure site monomers and/or modifiers as described below.

In another embodiment the polymers contain repeating units derived from VDF, TFE, HFP and optionally one or more further perfluorinated comonomer, for example the perfluorinated allyl and vinyl ethers as described above. Typical examples of such embodiments include polymers containing up to about 60% by weight of TFE, from about 10 to about 80% by weight of VDF and from about 10 to about 66% by weight of HFP and from about 19 to about 68% by weight, for example about 5 to about 45% by weight of one or more further perfluorinated comonomers including the perfluorinated allyl and vinyl ethers described above. The weight percentages are based on the total weight of the polymer and the amounts are selected to give a total of 100% by weight. In a particular example of this embodiment the fluoropolymer is a terpolymer of VDF, TFE and HFP and may additionally contain cure site monomers and/or modifiers as described below.

In another embodiment the fluoropolymers comprise repeating units derived from VDF, TFE and one or more further perfluorinated comonomers. Examples of further perfluorinated comonomers include but are not limited to the perfluorinated allyl or vinyl ethers as described above. For example the fluoropolymers may contain from about 14 to 80% by weight of VDF, from about 18 to about 66% by weight of HFP and from about 19 to 68% by weight of a PAAE or PAVE described above including a combination thereof. The weight percentages are based on the total weight of the polymer and the amounts are selected to give a total of 100% by weight. In a particular embodiment the fluoropolymers are terpolymers of TFE, VDF and a PAVE or a PAAE, but, optionally, may additionally contain cure site monomers and/or modifiers as described below and may, optionally contain a further PAVE or PAAE or a combination thereof. A particularly preferred PAVE is perfluoro methyl vinyl ether (PMVE).

Instead or in addition to the further perfluorinated comonomers described above, the fluoroelastomers may also contain units derived from non-fluorinated olefins ("non-fluorinated comonomers"). Examples include olefins containing from 2 to 8 carbon atoms and include but are not limited to vinyl chloride, vinylidene chloride, ethene (E) and propene (P). The amount of non-fluorinated comonomers in the fluoroelastomer, when present, is generally between greater than 0 and up to 60 mol %, preferably between 5 and 50 mol %.

Other exemplary combinations of comonomers include but are not limited to: polymers comprising or consisting of tetrafluoroethene, ethene and vinylidenefluoride; tetrafluoroethene, propene and vinylidene fluoride, and tetrafluoroethene, hexafluoropropene and ethene. Instead of non-halogenated comonomers, chlorinated fluoromonomers may be used, for example trichlorofluoroethene. The monomers are used in amounts to create a curable fluoropolymer as described above, e.g. a fluoropolymer having a Tg of less than 20° C.

In a particular embodiment the fluoropolymer contains from 5-30 mol % of TFE, 15-25 mol % of HFP, 50 to 80 ml % of VDF. In another embodiment the fluoropolymer contains from 5 to 20 mol % of TFE, 55 to 80 mol % of VDF and 15 to 25 of PAVE or PAAE. Specific examples include a fluoropolymer containing 25 mol % TFE, 53 mol % and 22 mol % HFP, having Tg of −7° C. and a Mooney viscosity (ML 1+10 at 121° C.) of 46; a fluoropolymer containing 13 mol % TFE, 68 mol % VDF and 19 mol % HFP and a Tg of −18° C. and a Mooney viscosity (ML 1+10 at 121° C.) of 48; a fluoropolymer containing 7 mol % TFE, 76 mol % VDF and 17 mol % HFP and a Tg of −23° C. and a Mooney viscosity (ML 1+10 at 121° C.) of 20; a fluoropolymer containing 8 mol TFE, 74 mol % VDF and 18 mol % PMVE and a Tg of −32° C. and a Mooney viscosity (ML 1+10 at 121° C.) of 21, a fluoropolymer containing 20 mol % TFE, 60 mol % VDF and 20 mol % MV-31 and a Tg of −40° C. and a Mooney viscosity (ML 1+10 at 121° C.) of 85. Such fluoropolymers have a nominal fluorine content of between 64 and 70 wt %.

Modifiers:

The fluoropolymers provided herein, further contain units derived from at least one perfluorinated bisolefinic ether. These ethers may modify the polymer architecture by generating branches in the polymer backbone. Therefore, these bisolefinic ethers are also referred to herein as "modifiers". Typically, the molar amount of units derived from any comonomer described herein is greater than the amounts of units derived from the modifiers. Suitable perfluorinated bisolefinic ethers include those represented by the general formula:

$$CF_2=CF-(CF_2)_n-O-(Rf)-O-(CF_2)_m-CF=CF_2$$

wherein n and m are independent from each other either 1 or 0 and wherein Rf represents a perfluorinated linear or branched, cyclic or acyclic aliphatic or aromatic hydrocarbon residue that may be interrupted by one or more oxygen atoms and comprising up to 30 carbon atoms. A particular suitable perfluorinated bisolefinic ether is a di-vinylether represented by the formula:

$$CF_2=CF-O-(CF_2)_n-O-CF=CF_2$$

wherein n is an integer between 1 and 10, preferably 2 to 7, e.g. n may be 1, 2, 3, 4, 5, 6 or 7. More preferably, n represents an uneven integer, for example 1, 3, 5 or 7.

Further specific examples include bisolefinic ethers according the general formula $$CF_2=CF-(CF_2)_n-O-(CF_2)_p-O-(CF_2)_m-CF=CF_2$$

wherein n and m are independently either 1 or 0 and p is an integer from 1 to 10 or 2 to 7. For example n may be selected to represent 1, 2, 3, 4, 5, 6 or 7, preferably, 1, 3, 5 or 7.

Further suitable perfluorinated bisolefinic ethers can be represented by the formula $$CF_2=CF-(CF_2)_n-O-(R_{af}O)_n(R_{bf}O)_m-(CF_2)_q-CF=CF_2$$

wherein $R_{af}$ and $R_{bf}$ are different linear or branched perfluoroalkylene groups of 1-10 carbon atoms, in particular 2 to 6 carbon atoms, and which may or may not be interrupted by one or more oxygen atoms. $R_{af}$ and/or $R_{bf}$ may also be perfluorinated phenyl or substituted phenyl groups, n is an integer between 1 and 10 and m is an integer between 0 and 10, preferably m is 0, p and q are independent from each other either 1 or 0.

Such modifiers can be prepared by methods known in the art and are commercially available, for example, from Anles Ltd. St. Petersburg, Russia.

Preferably, the modifiers are used and present in low amounts, for example in lower amounts than any of the comonomers described above. More preferably, the modifiers are present in amounts of greater than 0 and up to about 1.4%, for example from about 0.1% to about 1.2% or from about 0.3% to about 0.8% (by weight based on the total weight of fluoropolymer).

Cure Sites and Cure Site Monomers

The curable fluoropolymers provided herein further comprise at least one cure site as an end group. Suitable cure sites comprise iodine atoms. The curable fluoropolymers contain I-containing end groups, for example $-CF_2CH_2I$ and/or $-CH_2I$ groups. In addition to $-CF_2CH_2I$ they may also contain $-CF_2CH_2CF_2CH_2I$ groups. Typically, the curable fluoropolymers according to the present disclosure have a ratio of $-CF_2CH_2I$ to $-CF_2CH_2OH$ groups of at least 25, preferably at least 30, and typically from 25 to 50, or from at least 40 or at least 75 or from 45 to 75.

Iodine-containing cure site end groups as described above can be introduced by using an iodine-containing chain transfer agent in the polymerization. Iodine-containing chain transfer agents will be described below in greater detail. In addition halogenated redox systems as described below may be used to introduce iodine end groups.

Further iodine-containing cure sites may also be present in the curable fluoropolymers. In addition to the cure sites at the terminal position cure sites can also be distributed along the polymer chain. Cure sites within the polymer backbone can also be introduced by using a suitable cure-site monomer. Cure site monomers are monomers containing one or more functional groups that can act as cure sites.

In addition to iodine cures sites, other cure sites may also be present, for example Br-containing cure sites or nitrite containing cure sites. Br-containing cure sites may be introduced by Br-containing CTAs. Br-containing cure sites and nitrile containing cure sites may be introduced by cure site monomers, although the use of other cure sites than iodine may not be necessary.

Examples of cure-site comonomers include for instance:
a) bromo- or iodo-(per)fluoroalkyl-(per)fluorovinylethers, for example including those having the formula:

$$ZRf-O-CX=CX_2$$

wherein each X may be the same or different and represents H of F, Z is Br or I, Rf is a C1-C12 (per)fluoroalkylene, optionally containing chlorine and/or ether oxygen atoms. Suitable examples include $ZCF_2-O-CF=CF_2$, $ZCF_2CF_2-O-CF=CF_2$, $ZCF_2CF_2CF_2-O-CF=CF_2$, $CF_3CFZCF_2-O-CF=CF_2$, $ZCF_2CF_2-O-CF_2CF_2CF_2-O-CF=CF_2$ wherein Z represents BR of I; and (b) bromo- or iodo perfluoroolefins such as those having the formula:

$$Z'-(Rf)_r-CX=CX_2$$

wherein each X independently represents H or F, Z' is Br or I, Rf is a $C_1-C_{12}$ perfluoroalkylene, optionally containing chlorine atoms and r is 0 or 1; and c) non-fluorinated bromo and iodo-olefins such as vinyl bromide, vinyl iodide, 4-bromo-1-butene and 4-iodo-1-butene.

From the above iodine containing compounds, compounds according to (b) are preferred and more preferred are compounds according to (b) that are Br-free. Examples include compounds according to (b) wherein X is H, for example compounds with X being H and Rf being a C1 to C3 perfluoroalkylene. Particular examples include: bromo- or iodo-trifluoroethene, 4-bromo-perfluorobutene-1,4-iodo-perfluorobutene-1, or bromo- or iodo-fluoroolefins such as 1-iodo,2,2-difluoroethene, 1-bromo-2,2-difluoroethene, 4-iodo-3,3,4,4,-tetrafluorobutene-1 and 4-bromo-3,3,4,4-tetrafluorobutene-1:6-iodo-3,3,4,4,5,5,6,6-octafluorohexene-1.

Typically, the amount of iodine in the fluoropolymer is between 0.001 and 5%, preferably between 0.01 and 2.5% or 0.1 to 1% Of 0.2 to 0.6% by weight with respect to the total weight of the fluoropolymer. In one embodiment the curable fluoropolymers contain between 0.001 and 5%, preferably between 0.01 and 2.5%, or 0.1 to 1%, more preferably between 0.2 to 0.6% by weight of iodine based on the total weight of the fluoropolymer.

In a particular embodiment of the present disclosure the curable fluoropolymers contain iodine-containing cure site monomers and iodine end groups.

In addition to the 1- and/or Br-cure sites described above, the curable fluoropolymers may, optionally, further contain nitrile-containing cure sites. The presence of bromine-containing cure sites may not be necessary and in some embodiments the curable fluoropolymers do not contain any bromine-group containing cure sites. The presence of nitrile-containing cure sites may not be necessary and in some embodiments the curable fluoropolymers do not contain any nitrile-group containing cure sites.

Nitrile-containing cure sites may be reactive to other cure systems for example, but not limited to, bisphenol curing systems or triazine curing systems. Examples of such additional cure sites include nitriles, for example nitriles introduced into the polymer from nitrile containing monomers. Examples of nitrile containing monomers that may be used correspond to the following formulae: $CF_2=CF-CF_2-O-RF-CN$; $CF_2=CFO(CF_2)_rCN$; $CF_2=CFO[CF_2CF(CF_3)O]_r(CF_2)_vOCF(CF_3)CN$; $CF_2=CF[OCF_2CF(CF_3)]_kO(CF_2)_pCN$ wherein, r represents an integer of 2 to 12; p represents an integer of 0 to 4; k represents 1 or 2; v represents an integer of 0 to 6; u represents an integer of 1 to 6, RF is a perfluoroalkylene or a bivalent perfluoroether group. Specific examples of nitrile containing fluorinated monomers include perfluoro(8-cyano-5-methyl-3,6-dioxa-1-octene), $CF_2=CFO(CF_2)_5CN$, and $CF_2=CFO(CF_2)_3OCF(CF_3)CN$.

The curable fluoropolymers according to the present disclosure are peroxide-curable. They can be cured by a peroxide cure system to give cured fluoropolymers having good mechanical properties. In some embodiments the cured fluoropolymers have at least one or all of the following properties:
(i) an elongation at break of at least 110%, preferably at least 160% or even at least 210%;
(ii) a tensile strength of at least 13 or at least 16 MPa, preferably at least 19 MPa;
(iii) a Shore A hardness of at least 35, preferably at least 45.

Typical embodiments have a tensile strength of at least 13 or at least 16 MPa, a Shore A hardness of at least 45 and an elongation at break of at least 160%.

In particular embodiments of the present disclosure the curable fluoropolymers typically have Mooney viscosities (ML 1+10 at 121° C.) of 2 to 150, preferably 10 to 100, more preferably 30 to 70.

The fluoroelastomers may have a monomodal or bi-modal or multi-modal weight distribution. The fluoroelastomers may or may not have a core-shell structure. Core-shell polymers are polymers where towards the end of the polymerization, typically after at least 50% by mole of the comonomers are consumed, the comonomer composition or the ratio of the comonomers or the reason speed is altered to create a shell of different composition. Polymers obtained by a seed composition do not have to be core-shell polymers because the polymerization onto seed particles may take place at the beginning of the polymerization. Typically, the seed composition is present in low amounts and cannot be considered to form the core of the polymer. In fact the polymer built on the seed particles is considered to create the core of the polymer, which then may or may not contain one or more than one shell. The curable fluoropolymers provided herein have insurable curing behavior and curing properties. For example, the fluoropolymers provided herein can be cured to have a compression set of less than 35, 30 or even 25%. They may have a VDA compression set of less than 55, 50 or even 45%.

An advantage of the fluoropolymers provided herein is that curable fluoropolymers with a high number of iodine end groups can be prepared with essentially no fluorinated emulsifiers. In particular, the fluoropolymers according to the present disclosure may have a high distribution of iodine end groups over the entire population of the polymer, e.g., not only in the high molecular weight fractions, but also in the low molecular weight fractions of the polymer population, which may lead to compositions having a reduced amount of extractable material. This in turn may improve the processing properties of the curable polymers for example during and after molding, like improved demolding and/or reduced mold fouling. It is an advantage of the present disclosure that fluoropolymers having an amount of extractable materials ("extractables") of less than 4.0 wt % or even less than 3.0%, for example between 0.5 and 2.5% can be provided.

The fluoropolymers provided herein may have a number of iodine atoms per polymer chain (N) of at least 1.5, preferably at least 1.8 and most preferably at least 2.0 for $M_2/M_{N,0}=0.1$. Typical values for N at $M_2/M_{N,0}=0.5$ range from 2.0 to 3.0. The polymers may also or in addition have a value N of at least 2.0, preferably at least 2.2 and typically from 2.0 to 3.5 for $M_2/M_{N,0}=1$. The value for $M_2/M_{N,0}$ with $N<2.0$ is less than 0.5, preferably not higher than 0.2.

The polymers according to this invention have a value of $dN/d(M_2/M_{N,0})$ of <2, or preferably of <1.8 or most preferred of <1.5.

Methods of Making Curable Fluoropolymers

The fluorinated polymers according to the present disclosure can be made by aqueous emulsion polymerization of the fluorinated monomers described above comprising using one or more reaction initiator(s), one or more iodine-containing chain transfer agents, one or more modifiers and, optionally, one or more cure-site monomers. One or more non-fluorinated emulsifier is used in the preparation of the curable fluoropolymers. The addition of fluorinated emulsifiers is not necessary and can be avoided altogether. In one embodiment an aqueous polymerization is used in the presence of one or more non-fluorinated emulsifiers. Preferably a seed composition is used in the polymerization to produce the fluoropolymers and more preferably, the one or more fluorinated emulsifiers are used to prepare the seed composition. No fluorinated or non-fluorinated emulsifier is or has to be added during the polymerization onto the seed composition and more preferably no fluorinated emulsifier is added to prepare the seed composition. If no seed polymerization is used the non-fluorinated emulsifier may be added prior the polymerization has started or during the polymerization or both. Preferably, a seed composition is used and no emulsifier, be it fluorinated or non-fluorinated, is added during the polymerization onto the seed composition.

Preparation of Seed Compositions:

The seed compositions for use in the preparation of the curable fluoropolymers a described herein can be prepared by aqueous emulsion polymerization as known in the art. Ordinary reaction conditions and equipment for preparing fluoropolymers by aqueous emulsion polymerization may also be used to prepare the seed compositions. To make the seed compositions the comonomers are polymerized in an aqueous emulsion polymerization involving a reaction initiator (hereinafter also referred to as "initiator for making seed particles") and at least one emulsifier. The emulsifier may be a fluorinated emulsifier or a saturated, non-fluorinated emulsifier or a combination of both. Preferably the emulsifier to produce seed fluoropolymer particles is a saturated non-fluorinated emulsifier. Auxiliaries as known in the art for producing fluoropolymers by aqueous emulsion polymerization may be used, for example buffers and complexing agents. The reaction initiator and the saturated non-fluorinated emulsifier will be described in greater detail below in the respective sub-sections.

The seed composition contains fluorinated seed particles used polymers). Seed composition are typically aqueous dispersions or emulsions of fluorinated seed particles. Typically, the seed particle may have an average particle size ($D_{50}$) of up to 150 nm. In one embodiment the seed particles typically have an average particle size ($D_{50}$) of up to 51 nm, for example between about 5 nm and 50 nm, or preferably up to 30 nm, and more preferably between about 15 nm and about 25 nm. The seed composition is obtainable by aqueous emulsion polymerization of comonomers in the presence of an initiator for making seed particles. Typically one or more non-fluorinated emulsifier described herein is used in the polymerization. The seed composition can be prepared without adding any fluorinated materials other than the monomers. In particular, the seed composition can be prepared without adding fluorinated emulsifiers and/or without adding any saturated fluorinated compounds like fluorinated hydrocarbons or fluorinated hydrocarbon ethers or polyethers. The reaction mixture may, however, include the presence of buffers and other auxiliaries, for example, non-halogenated chain transfer agents or complexing agents. Typical chain transfer agents include hydrocarbon ethers (for example but not limited to dimethyl ether, t-butyl-methyl ether), hydrocarbon alcohols (for example but not limited to ethanol), hydrocarbon esters (for example but not limited to malonic acid esters such as methyl malonates, ethyl malonates) as known in the art.

The comonomers used for making the seed particles can be the same comonomers used to make the curable fluoropolymers but can also be different comonomers. Suitable comonomers are the same as described above under the section "comonomers". They may be used in the same combinations and same amounts described above under the section "comonomers". Preferable, the comonomers used in the reaction to make seed particles comprise vinylidenfluoride (VDF) and at least one perfluorinated monomer selected from hexafluoropropene (HFP), tetrafluoroethene (TFE), a perfluoroalkylvinyl ether (Pave), a perfluoroalkylallylether (PAAE), and/or at least one non-fluorinated selected from ethene and propene or a combination thereof. A typical seed composition comprises repeating units derived from VDF, HFP, TFE and, optionally ethene and/or propene.

The amounts of initiators, emulsifiers and monomers are adapted to provide seed particles of the desired particle size.

The seed particles may be amorphous or crystalline, i.e. the seed particles may have a melting point and are crystalline or they may not have a distinct melting point and are elastomeric.

The polymerization to make the seed composition is run to produce seed compositions with seed particles having average particle sizes as described. The seed particles are typically produced in amounts of from about 0.05 to about 5% by weight based on the total weight of the seed composition, for example 0.5 to 4.5% by weight. Preferably, all ingredients are fed in the reaction vessel before the reaction initiator is added. The reaction initiator may be fed continuously, e.g. at a slow rate, to the composition to start the reaction. However, the reaction initiator may also be added in intervals or at a single dose or by a combination thereof. The reaction initiators to prepare the seed composition can be the same or different reaction initiators used to make the curable fluoropolymers (referred hereinafter also referred to as "initiators for preparing curable fluoropolymers"). Standard initiators for the polymerization of fluoropolymers may be used, in particular standard initiators for aqueous emulsion polymerizations. Typically the initiators are compounds that decompose to produce free radicals under the reaction conditions. General examples include peroxides, preferably inorganic peroxides, and permanganates. Specific examples include, but are not limited to, ammonium permanganate, potassium permanganate, potassium or ammonium sulfinate, ammonium peroxodisulfate, potassium peroxodisulfate or combinations thereof. Preferably, water soluble reaction initiators are used. The reaction initiators may be used in combination with reducing agents as known in the art (typical examples include transition metal salts, hydroxyl acids, halogen salts, oxoacids or oxyacids of sulfur). Redox initiator systems may also be used, including but not limited to a combination of a peroxodisulfate salt and a bisulfite salt.

To avoid generation of metal content which may be detrimental in some application, ammonium salts may be used instead of alkali salts.

In one embodiment the reaction initiators for preparing the seed compositions include peroxodisulfates with or without combination with reducing agents. In one embodiment the reaction initiators for preparing the seed compositions include permanganates with or without combination with reducing agents. In one embodiment the reaction initiators for preparing the seed compositions do not include permanganates.

Saturated Non-Fluorinated Emulsifiers:

The saturated, non-fluorinated emulsifiers to be used according to the present disclosure are also referred herein above and below simply as "non-fluorinated emulsifiers". The saturated non-fluorinated emulsifiers may be anionic or non-ionic. They are preferably used in amounts of from about 50 to 4,000 ppm, more preferably in amounts from about 100 to 3000 ppm based on the aqueous phase of the seed composition. Their amount may be adapted to the amounts of initiators and monomers used to obtain seed particles of the desired particle size.

Non-Ionic, Saturated, Non-Fluorinated Emulsifiers:

Typical non-ionic, non-fluorinated saturated emulsifiers include polycaprolactones (for example as disclosed in WO2009/126504), siloxanes (for example as disclosed in EP 1 462 461), polyethylene polypropylene glycols (for example as disclosed in WO2008/073686, U.S. Pat. No. 8,158,734 or EP 2 089 462), cyclodextrines (for example as described in EP 0 890 592), carbosilanes (for example as described in EP 2 069 407) and sugar-based emulsifiers. Others include polyetheralcohols, for example those of the general formula

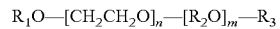

$R_1O-[CH_2CH_2O]_n-[R_2O]_m-R_3$ wherein $R_1$ represents a linear or branched aliphatic or aromatic hydrocarbon group. Preferably $R_1$ has at least 6 carbon atoms, preferably 8 to 18 carbon atoms. In a preferred embodiment, the residue $R_1$ is a residue $(R')(R'')C-$ wherein R' and R" are the same or different, linear, branched or cyclic alkyl groups, wherein the total amount of carbon atoms is at least 6 and preferably from 8 to 18. $R_2$ represents an alkylene unit having 3 or 4 carbon atoms. $R_3$ represents hydrogen, a $C_1$-$C_3$ alkyl or hydroxyl alkyl group, n has a value of 0 to 40, m has a value of 0 to 40 and the sum of n+m is at least 2. $R_3$ is chosen such that a terminal hydroxyl group is present. For example $R_3$ can be H or a hydroxyalkyl residue such as hydroxy alyklene groups, for example hydroxy methlyene In a preferred embodiment the non-ionic emulsifiers are sugar-based emulsifiers. They include polyhydroxy surfactants having a polyhydroxy unit, providing a polar entity, linked to a non polar long-chain unit via a linking group. The linking group can be a chemical unit or a chemical bond. The polyhydroxy unit may be acyclic or cyclic. The emulsifier may comprise a plurality of cyclic or acyclic polyhydroxy units. The polyhydroxy unit has at least two hydroxyl groups (—OH groups). Preferably, the polyhydroxy unit contains at least two adjacent hydroxyl groups directly linked to the cyclic ring or acyclic chain as the case may be. The emulsifiers are typically non fluorinated. Generally, they are non-aromatic. Preferably, they are non-ionic. In a preferred embodiment they are non-fluorinated, non-aromatic, saturated and non-ionic.

The long chain unit may contain from 4 to 40 carbon atoms. Typically, it is based on a hydrocarbon chain. It typically contains or consist of hydrocarbon or a (poly)oxy hydrocarbon chain, i.e. a hydrocarbon chain that is interrupted once or more than once by an oxygen atom. Typically the long chain unit is an alkyl chain or a (poly)oxy alkyl chain, i.e. an alkyl chain that is interrupted once or more than once by an oxygen atom to provide a catenary ether function. The long chain unit may be linear, branched or cyclic but preferably is acyclic.

In one typical embodiment of the present disclosure the polyhydroxy emulsifiers according to the present disclosure contain at least one polyhydroxy unit that is acyclic. Examples of such embodiments include compounds represented by the general formula (I):

R1-Li—R2     (I)

wherein R1 represent the long chain unit, Li the linking group and R2 the acyclic polyhydroxy unit.

R1 is a linear or branched aliphatic residue containing from 4 to 26 carbon atoms, wherein the carbon chain of the aliphatic residue may optionally be interrupted by one or more catenary oxygen (ether) atoms; R1 is preferably acyclic. R1 may be an alkyl or alkenyl group wherein the carbon chain may, optionally, be interrupted by one or more than one catenary oxygen atoms to form an ether or polyether residue. Optionally, the alkyl or alkenyl group may also and in addition be substituted by alkoxy or polyoxy alkyl groups.

Li is selected from linking group containing one or more nitrogen atoms, (for example a linking group containing an amino group, an amido group, a sulfoamido group, or a phosphoamido group), phosphate ester groups, phosphonate ester groups, sulfate ester groups, sulfonate ester groups, or carboxylate ester groups. Preferably, Li represents a linking group containing one or more nitrogen atoms.

R2 represents an acyclic aliphatic poly hydroxylated group having at least two preferably adjacent, hydroxyl groups (—OH groups) directly bonded to the carbon chain of the aliphatic residue. Preferably, the poly hydroxylated group R2 contains from 4 to 36 carbon atoms. In addition to the hydroxyl groups, the poly hydroxylated group R2 may also contain other substituents, for example alkoxy or polyoxy alkyl substituents but preferably the group R2 does not contain substituents other than the hydroxyl groups R2 may be linear or branched. R2 preferably contains a unit of the formula —(CHOH)n- wherein n is an integer from 2 up to and including 8.

In some examples according to the acyclic embodiment the poly hydroxy emulsifiers are nitrogen-containing surfactants and can be represented by formula (II):

R1-Li—R2'-CH₂OH     (II)

wherein R1 is defined as above with regard to formula (I), R2' is an acyclic polyhydroxylated aliphatic group. R2' may be acyclic and is linear or branched and may contain from 3 to 20 carbon atoms and has at least two, preferably adjacent, hydroxyl groups directly bonded to the carbon chain, wherein the chain may further may be interrupted by one or more than one catenary oxygen atoms to introduce ether or polyether functionalities. Preferably, R2' contains a unit —(CHOH)$_n$— wherein n is an integer from 2 up to and including 8.

Li represents a linking group comprising one or more nitrogen atoms. Preferably Li represents an amino (—N(R)~) group, or an amido (—(C=O)N(R)—) group wherein R represents hydrogen or a (linear or branched) alkyl residue, wherein the alkyl residue may optionally be substituted by one or more catenary oxygen atoms (ether atoms).

Acyclic polyhydroxy emulsifiers as described above may be conveniently obtained, for example, by reacting a glycoamine (providing the polyhydroxy unit) with functionalized alkyls or alkenyls (providing the long chain unit) as described, for example, in U.S. Pat. No. 5,380,891 to Connors et al, incorporated herein by reference. Glycoamines can be obtained by a reductive amination of a reducing sugar yielding an amino-functionalized ring-opened sugar, the glycoamine. For example a glucose (formula 1) can be converted in this way into the respective glycoamine (or glucamine, formula 2.)

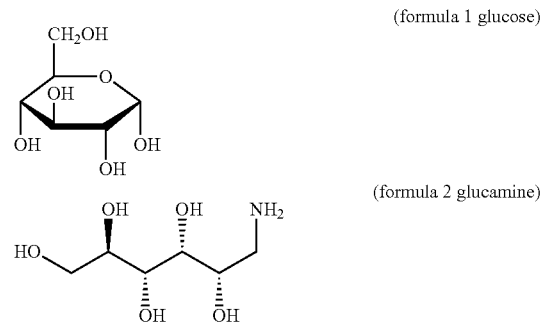

The glycoamines are reacted with alkyls (or alkenyls) functionalized to react with the amine group of the glycamines to form a nitrogen-containing linking group linking the alkyl (or alkenyl) chain to the sugar-derived polyhydroxy chain. Typical functional groups of the functionalized alkyls (or alkenyls) include but are not limited to acid groups, ester groups including anhydride groups and acide halide groups. Examples of suitable functionalized alkyls (or alkenyls) include but are not limited to fatty acids or fatty acid esters. Accordingly, residue R1 in formulae (I) and (II) may correspond to the hydrocarbon part R' of a fatty acid R'COOH. Fatty acids include saturated and unsaturated fatty acids. Examples of saturated fatty acids include, but are not limited to caprylic acid, capric acid, lauric acid, myristic acid, palmitic acid, stearic acid, arachidic acid, behenic acid, lignoceric acid and cerotic acid. Examples of unsaturated fatty acids include but are not limited to myristoleic acid, palmitoleic acid, sapienic acid, oleic acid, elaidic acid, vaccenic acid, linoleic acid, linolaidic acid, linolenic acid, arachidonic acid, eicosapentaenoic acid, erucic acid, docosabexanenoic acid R1 may also correspond to the residue of a functionalized aliphatic residue R"X wherein X is a functional group to react with the glycoamine to form the linking gioup and R" may represent an alkyl or alkenyl residue that contains one or more catenary oxygen atoms, like for example a (poly) ethoxylate or (poly) propoxylate residue or a combination thereof.

In the reductive amination of a sugar the sugar is typically reacted, with ammonia or an alkylamine or alkyloxy or polyoxy alkyl amine (RNH₂, wherein R represents H or the alkyl, alkyloxy or polyoxy alkyl group) under reducing conditions, e.g. in the presence of hydrogen and optionally in the presence of catalysts as is known in the art, like for example Ranney nickel. Typical examples are described in U.S. Pat. No. 5,380,891, incorporated herein by reference. Preferred sugars that may be used in the above described reaction to prepare glycoamines include but are not limited to glucose, fructose, maltose, lactose, galactose, mannose, and xylose, as well as glyceraldehyde. In some embodiments high dextrose corn syrup, high fructose corn syrup, high maltose corn syrup may also be used as raw materials but yield a mixture of glycoamines.

In a preferred embodiment of the present disclosure the polyhydroxy surfactants are amido polyhydroxides. They can be represented by the general formula (III):

$R^1$—C(=O)—N($R^3$)—Z    (III)

wherein $R^3$ is H or a linear or branched aliphatic residue containing from 1 to 8 carbon atoms, preferably $R^3$ is H or a $C_1$-$C_4$ hydrocarbyl or hydroxyhydrocarbyl, wherein the carbon chain of the aliphatic residue may optionally be interrupted by one or more than one catenary oxygen (ether) atoms $R^3$ may be linear or branched. Examples of suitable hydroxyhydrocarbyl groups include but are not limited to 2-hydroxyethyl, 2-hydroxypropyl, 2 hydroxybutyl, 3-hydroxy propyl, 3-hydroxy butyl, 4-hydroxy butyl. In preferred embodiments $R^3$ represents an alkyl group, more preferably an alkyl group selected from methyl, ethyl, butyl and isobutyl.

$R^1$ in formula (III) is as defined as R1 of formula (I). Generally $R^1$ represents a linear or branched aliphatic residue containing from 5 to 31 carbon atoms, preferably a $C_5$-$C_{31}$ hydrocarbyl moiety. In some embodiments, $R^1$ represents a straight chain $C_6$ to $C_{20}$ alkyl or alkenyl residue, preferably a $C_7$-$C_{19}$ alkyl or alkenyl moiety, preferably a straight chain $C_9$-$C_{17}$ alkyl or alkenyl moiety, and more preferably, a straight chain $C_{11}$-$C_{19}$ alkyl or alkenyl moiety. Typically, $R^1$ may be the hydrocarbon part R of a fatty acid RCOOH. Fatty acids include saturated and unsaturated fatty acids. Examples of saturated fatty acids include, but are not limited to caprylic acid, capric acid, lauric acid, myristic acid, palmitic acid, stearic acid, arachidic acid, behenic acid, lignoceric acid and cerotic acid. Examples of unsaturated fatty acids include but are not limited to myristoleic acid, palmitoleic acid, sapienic acid, oleic acid, elaidic acid, vaccenic acid, linoleic acid, linolaidic acid, linolenic acid, arachidonic acid, eicosapentaenoic acid, erucic acid, docosahexanenoic acid. $R^3$ may also represent an alkyl residue as described above that contains one or more catenary oxygen atoms, like for example an ethoxylate or propoxylate residue or a combination thereof.

In formula (III) Z represents a poly hydroxyl hydrocarbyl moiety having at least 2 or at least 3 hydroxy groups directly bonded to the carbon chain Z is acyclic and may be linear but may also be branched. Z may also contain, in addition to the hydroxyl groups, alkoxy or polyoxyalkyl groups but preferably only contains hydroxyl groups. Z may be derived from a glycamine, e.g. a reducing sugar subjected to a reductive animation reaction to yield a ring-opened amino functionalized sugar. Examples for reducing sugars include but are not limited to glucose, fructose, maltose, lactose, galactose, mannose, xylose and glyceraldehydes, including combinations thereof. In some embodiments high dextrose corn syrup, high fructose corn syrup, high maltose corn syrup may also be used as raw materials which will yield a mixture of glycoamines.

In preferred embodiments Z contains an acyclic unit represented by the general formula —(CHOH)$_n$— more preferably —(CHOH)$_n$—CH$_2$—OH wherein n represents an integer of from 2 up to and including 8. Particular examples include embodiments wherein Z is selected from the acyclic groups consisting of —CH$_2$—(CHOH)$_n$—CH$_2$OH:
—CH$_2$OH)—(CHOH)$_{n-1}$—CH$_2$OH; and
—CH$_2$—(CHOH)$_2$—(CHOR")$_m$—(CHOH)$_o$—CH$_2$OH;

where n is an integer from 1 up to and including 8 preferably up to and including 5; m and o are integers and including 0 wherein the sum of m and o equals n-2 and R" represents substituents selected from identical of different alkoxy, polyoxyalkyl and (poly)hydroxyalkoxy or (poly)hydroxypolyoxyalkyl residues. Specific example include but are not limited to 1-deoxyglucityl, 2-deoxyglucityl, 2-deoxyfructityl, 1-deoxymaltityl, 1-deoxylactityl, 1-deoxygalactityl, 1-deoxymannityl, 1-deoxymaltotriotityl, 2,3-dihydroxypropyl (from glyceraldehyde), etc. In a preferred embodiment Z is a glycityl, more preferably Z if —CH$_2$—(CHOH)$_4$—CH$_2$—OH.

In some embodiments the polyhydroxides are the reaction product of the reaction of N-alkyl glucamines (e.g. N-methylamine) and fatty acids or fatty acid alkyl esters—as for example described in U.S. Pat. No. 5,380,891.

According to another embodiment of the present disclosure the polyhydroxy surfactants are present as a blend of several polyhydroxy surfactants.

In another embodiment of the present disclosure the polyhydroxy emulsifier contains at least one cyclic polyhydroxy unit. Such emulsifiers may be sugar-based. The sugar-based emulsifiers are typically based on sugars that have been modified to contain at least one long chain unit. The long chain unit of the cyclic emulsifiers may be acyclic and may be linear or branched. In a typical embodiment the long chain unit contains from 4 to 26 carbon atoms, for example from 8 to 22 or from 10 to 16 carbon atoms. The chain may be interrupted once or more than once by catenary heteroatoms, including O (oxygen) and N (nitrogen) atoms, but preferably catenary oxygen atoms, to form an ether or polyether residue. The long chain unit typically comprises an alkyl chain, which may, optionally, contain one or more catenary heteroatoms, preferably oxygen atoms and may, optionally, contain substituents including alkoxy or polyoxyalkyl substituents. The long chain unit may be attached to the polyol unit directly of via a linking group. Examples of linking groups include but are not limited to ether, ester, or amide groups and combinations thereof.

In a typical embodiment the cyclic polyol unit to which the long chain unit is attached contains at least one six-membered ring of 5 carbon atoms and one hetero atom as described above, preferably, an oxygen atom. In another typical embodiment the cyclic polyol unit to which the long chain unit is attached contains at least one five-membered ring of 4 carbon atoms and one hetero atom as described above, preferably, an oxygen atom. In a preferred embodiment the polyol unit further contains at least two or at least three adjacent hydroxy groups (—OH groups) bound to the carbon ring atoms. The cyclic polyol unit is most conveniently a sugar and the emulsifiers are sugar-based emulsifiers. The sugar-based emulsifiers may contain a single cyclic polyol (sugar) unit or multiple cyclic polyol (sugar) units. The sugar-based emulsifier according to this embodiment of the present disclosure is typically a sugar that has been modified to contain the long chain unit and the sugar forms the polyol unit of the sugar-based emulsifier. In some embodiments the sugars have been modified in that one or more of the hydrogen atoms of a hydroxy group bound to the carbon ring atom of the sugar has been substituted by the long chain residue such that an ether, ester or amide bond is created between the long chain residue and the sugar moiety.

The sugar-based emulsifiers may comprise more than one cyclic polyol unit, which units may be identical or different. The polyol typically comprises a six-membered ring, typically a pyranose ring (a six-membered ring of five carbon atoms and one oxygen atom). Suitable sugar based emulsifiers include but are not limited to alkyl glycosides (which include monoglycosides and polyglycosides). Glycosides are sugar molecules that are modified to contain a non sugar unit. For example alkyl glycosides are sugars modified to contain an alkyl unit. Examples for the sugar parts of the glycosides include, but are not limited to monosaccharides and polysaccharides. Monosaccharides include pentoses and hexoses. Typical examples of monosaccharides include ribose, glucose, galactose, mannose, fructose, arabinose, xylose. Polyglycosides include oligomers containing from 2 to 10, preferably 2 to 4 sugar units of the same or different monosaccharides and include oligosaccharides including but not limited to saccharose, maltose, lactose, raffinose and isomaltose.

Specific examples of sugar-based emulsifiers include but are not limited to alkyl glucosides. Alkyl glucosides include monoglucosides (i.e. a molecule with a single glucose moiety modified to contain an alkyl group) diglucosides (i.e. a molecule with two glucose moieties) and poly glucosides (i.e. molecules with two or more glucose moieties and typically up to 4 or even up to 10 glucose units).

The glycosides may contain only glucose units (in which case the glycosides are referred to as glucosides) but may also contain units of other sugars. The sugar moiety may be present as a pyranose or as combinations of pyranoses or combinations of pyranoses and furanoses. The sugar moiety may also be present as furanose or a combination of furanoese only (furanoses are five membered rings of four carbon ring atoms and one oxygen ring atom) and mixtures thereof (for example, but not limited to glucopyranosides, glucofuranosides, di-glucopyranosides, di-furanosides, glucopyranoside-glucofuranosides the like). Preferably, the glycosides are alkyl glucosides. The alkyl glucosides may contain a single, multiple, identical and different alkyl residues as long chain units as described above. The alkyl residues include linear or branched, acyclic residues containing at least 6 carbons, preferably at least 8 carbon atoms. In a typical embodiment the alkyl chain contains from 6 to 26, or from 8 to 16 carbon atoms. The alkyl chains may be substituted, wherein the substituents include, for example, halogens (other than fluorides) or catenary (ether) oxygen atoms, e.g. the long chain moiety may be a (poly)oxy alkyl. The alkyl chains are preferably not substituted. The glucosides may be mono, di- or polyglucosides, i.e., the may contain one, two or at least two glucose units, preferably from 1 to 4 glucose units.)

Formula 3 represents a typical example of a (poly) glycoside, wherein m represents an integer of 1 and up to 10, preferably m represents 1, 2, 3 or 4 and R represents the long chain unit as described above. For example, R may represent a linear or branched alkyl, oxyalky, polyoxyalkyl chain as described above. The sugar unit represented in formula 3 is a glucose and the compound can also be referred to as a glucoside. In case R represents an alkyl group the compound represented in formula 3 would be an alkyl(poly)glucoside. As described above, instead of a glucose also other sugars or combinations of other sugars with glucose may be used.

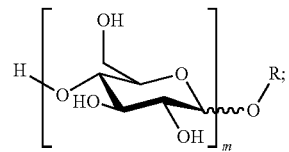

Formula 3 an example of a (poly)glycoside.

According to a specific embodiment of the present disclosure the sugar-based emulsifiers may be present as a blend of sugar-based emulsifiers. The blend may contain sugar-based emulsifiers of different chain lengths, i.e. the sugar-based emulsifiers are at least bimodal compositions having populations of different chain length. For example, the first population may contain chains having from 6 to 10 carbon atoms and the second population contains chains from 10 to 18 carbon atoms. Such multimodal composition can be prepared by blending the appropriate sugar-based emulsifiers. Examples of blends include blends containing from about 20 to 50% by weight of a population a), which is the population containing sugar-based emulsifiers with chain length from 6 to 10 carbon atoms and from 20 to 50% by weight of a population b), which is the population containing sugar-based emulsifiers with chain length from 10 to 18 carbon atoms.

Sugar-based emulsifiers are commercially available. The synthesis of sugar-based emulsifiers is described for example in D. Geetha and R. Tyagi, Tenside Surf. Det. 49 (2012) 5, pages 417 to 427.

The non-fluorinated polyhydroxy emulsifiers described above may be added to the reaction mixture prior to the polymerization to make seed particles. The non-fluorinated polyhydroxy emulsifiers described herein can also be added intermittently or continuously over the course of the polymerization to make seed particles, for example after a part of the total amount of the non-fluorinated polyhydroxy emulsifiers had been precharged.

Non-Fluorinated Saturated Anionic Emulsifiers:

Suitable non-fluorinated, saturated anionic emulsifiers according to the present disclosure include polyvinylphosphinic acids, polyacrylic acids and polyvinyl sulfonic acids (for example as described in WO 2007/018783), alkyl phosphonic acids (for example as described in U.S. Pat. No. 8,124,699), alkyl phosphates (for example as described in WO 2008/076385), hydrocarbon anionic surfactants as described, for example in EP 2 091 978 and EP 1 325 036.

Particular embodiments of anionic emulsifiers include sulfate or sulfonate emulsifiers, typically hydrocarbon sulfates or sulfonates wherein the hydrocarbon part may be substituted by one or more catenary oxygen atoms, e.g. the hydrocarbon part may be an ether or polyether residue. The hydrocarbon part is typically aliphatic. The hydrocarbon part may contain from 8 to 26, preferably from 10 to 16 or from 10 in 14 carbon atoms. The non-fluorinated emulsifiers contain one or more than one sulfate or sulfonate groups. In preferred embodiments the emulsifiers contain one or more than one secondary or tertiary sulfonate or sulfate. Secondary means the sulfate or sulfonate group is bonded to a secondary carbon atom, and tertiary means the sulfate or sulfonate group is bonded to a tertiary carbon atom. A secondary carbon atom is bonded to two other carbon atoms and a tertiary carbon atom is bonded to three other carbon atoms. The non-fluorinated emulsifiers may be linear, branched, cyclic or acyclic and branched. Preferably the non-fluorinated emulsifiers are aliphatic and do not contain any aromatic groups. In a preferred embodiment the non-fluorinated emulsifiers are sulfonates, for example monosulfonates or polysulfonates, e.g. disulfonates, preferably secondary sulfonates.

The sulfonates or sulfates are anionic. They may have any cation as counterions. Preferably, the emulsifiers are used as ammonium salts to avoid metal contamination of the final products or contain sodium or potassium cations which can be tolerated in most applications.

Further specific examples of suitable surfactants include alkyl ether sulfates, e.g. salts of $C_{12}/C_{14}$ alkyl ether sulfates with 2-8 ethyleneoxide (EO)-units, lauryl sulfoacetates including those of the general formula:

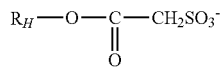

fatty alkyl amine sulfosuccinates, fatty acid isothionates, fatty acid methyl taurides, fatty acid sarkosin and sarkoside, phosphate esters with EO-units including those of the general formula $R_H$—O—$CH_2$—$CH_1$—O—$CH_2$—$CH_2$O—$PO_3^-$, sulfomethylester including those of the general formula:

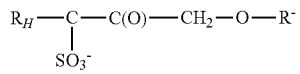

acylsarkosins including those of the general formula:

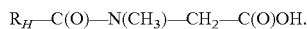

In the above formulae $R_H$ represents C8-C18 linear or branched, saturated or unsaturated fatty acid residues like lauryl, cocoyl, myristyl, stearyl or oleyl.

In some embodiments suitable non-fluorinated emulsifiers according to the present disclosure can be described by the general formula:

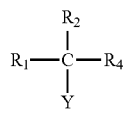

wherein Y is a sulfate or a sulfonate group, and $R_1$, $R_2$ are independently H, $C_1$-$C_{20}$ alkyl (linear or branched) with the proviso that $R_1$ and $R_2$ are not both H, $R_4$ is $C_1$-$C_{20}$-alkyl, or $R_3$—Z, with Z being a sulfonate or a sulfate group and $R_3$ being a $C_1$ to $C_{20}$ alkylene group which may be linear, branched or cyclic. Optionally, the alkyl or alkylene residues of $R_1$ to $R_4$ may, independently from each other, contain one or more catenary oxygen (ether) atoms.

In some embodiments Z and Y are sulfonates. Y may be a sulfonate group, $R_4$ an alkyl group $R_1$, $R_2$ are independently H, $C_1$-$C_{18}$ alkyl (linear or branched) with the proviso that $R_1$ and $R_2$ are not both H and wherein the number of carbon atoms of the molecule is from and including 8 to 16 and preferably from and including 10 to 14. The groups may contain one or more catenary oxygen (ether) atom. Compounds of this type commercially available under the trade designation HOSTAPUR SAS from Clariant.

In a preferred embodiment fluorinated sulfonate or sulfate emulsifiers with oxygen containing moieties are used. They may produce smaller particles compared to their alkyl homologies and may thus produce more stable emulsions or seed compositions.

Particular embodiments of anionic emulsifiers include aliphatic hydrocarbon sulfate or sulfonate emulsifiers, wherein the hydrocarbon part contains one or more oxygen containing moieties. The hydrocarbon part may contain from 8 to 26, preferably from 10 to 16 or from 10 to 14 carbon atoms. The emulsifiers may contain one or more than one sulfonate or sulfate group. Sulfonate groups are preferred. Examples of oxygen containing moieties include alkyl ether or poly ether alkyl groups. Such examples include but are not limited to ethylene oxy (—$CH_2CH_2$—O—) groups, propylene oxy (—$CH_2CH_2CH_2$—O—; —$CH_2C(CH_3)CH_2$—O—; —$CH(CH_3)$—$CH_2CH_2$—O—) groups or combinations thereof.

Other examples of oxygen containing moieties include carboxylate ester (—O—C(=O)—) groups and carboxamide (—NYX—C(=O)— groups wherein Y and X may be H, or an alkyl groups, preferably a methyl or ethyl group and combinations thereof.

Examples of carboxamides include but are not limited to taurides as shown in formula 4 (representing the sodium salt), wherein R represents an alkyl rest, typically a $C_8$-$C_{18}$ alkyl residue. Particular examples of R include $C_{12}$, $C_{14}$, $C_{16}$, $C_{18}$ alkyls or mixtures of $C_8$-$C_{18}$, or $C_{11}$-$C_{17}$ alkyls.

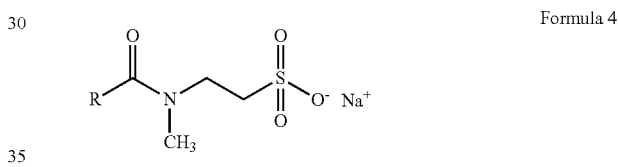

Formula 4

Specific examples of emulsifiers with carboxylate ester group containing emulsifiers include but are not limited to esters of alky carboxylic acids with ethione acid (HO—$CH_2$—$CH_2$—$SO_3H$), so called ethionates. Other examples include sulfosuccinates such dialkyl sulfosuccinates (formula 5, showing an di-isooctysulfosuccinate sodium salt) or acylsulfosuccinates (formula 6).

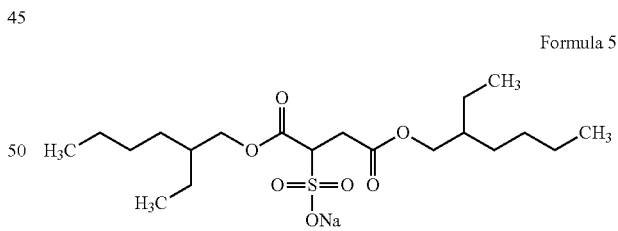

Formula 5 diisooctylsulfosuccinate as example for sulfosuccinate emulsifiers
acetosulfosuccinates:

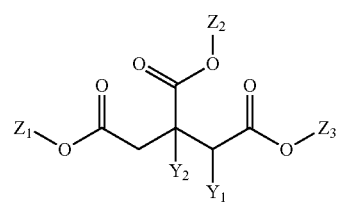

Formula 6

In formula 6 $Y_1$ represents H or —$SO_3M$, $Y_2$ represents H or $SO_3M$ wherein $Y_1$ and $Y_2$ are not both H and preferably $Y_1$ is H, $Z_1$, $Z_2$ and $Z_3$ represent alkyl residues typically having from about 2 to 12 carbon atoms, and including perfluoro or partially fluorinated alkyl residues with the proviso that when $Z_1$, $Z_2$ or $Z_3$ represent fluorinated alkyl residues, the fluorinated alkyl residues have no more than 4, preferably no more than 5 carbon atoms Examples of acetosulfosuccinates are described, for example, in WO2010/149262.

Examples of commercially available sulfonate or sulfate emulsifiers with one or more oxygen containing moiety include but are not limited to GENAPOL LRO (alkyl ether sulfate); EMULSOGEN SF; AEROSOL OT 75 (dialkyl sulfosuccinates); HOSTPON SCI65 C (alkyl fatty acid isethionate) sulfonate). HOSTAPON CT; ARKOPON T8015 (fatty acid methyl taurides) from Clariant.

The non-fluorinated emulsifiers descried above may be added to the reaction mixture prior to the polymerization to make seed particles. The non-fluorinated emulsifiers described herein can also be added intermittently or continuously over the course of polymerization, for example after a part of the total amount of the non-fluorinated emulsifiers had been pre-charged.

Fluorinated Emulsifiers

Fluorinated emulsifiers include compounds that correspond to the general formula:

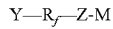

$$Y-R_f-Z-M$$

wherein Y represents hydrogen, Cl or F; $R_f$ represents a linear, cyclic or branched perfluorinated or partially fluorinated alkylene having 4 to 18 carbon atoms and which may or may not be interrupted by one or more ether oxygens, Z represents an acid anion (e.g. $COO^-$ or $SO_3^-$) and M represents a cation like an alkali metal ion, an ammonium ion or $H^-$. Exemplary emulsifiers include: Perfluorinated alkanoic acids, such as perfluorooctanoic acid and perfluorooctane sulphonic acid. Preferably, the molecular weight of the emulsifier is less than 1000 g/mole.

Specific examples are described in, for example US Pat. Publ. 2007/0015937 (Hintzer et al.). Exemplary emulsifiers include: $CF_3CF_2OCF_2CF_2OCF_2COOH$, $CHF_2(CF_2)_5COOH$, $CF_3(CF_2)_6COOH$, $CF_3O(CF_2)_3OCF(CF_3)COOH$, $CF_3CF_2CH_2OCF_2CH_2OCF_2COOH$, $CF_3O(CF_2)_3OCHFCF_2COOH$, $CF_3O(CF_2)_3OCF_2COOH$, $CF_3(CF_2)_3(CH_2CF_2)_2CF_2CF_2CF_2COOH$, $CF_3(CF_2)_2CH_2(CF_2)_2COOH$, $CF_3O(CF_2)_2COOH$, $CF_3(CF_2)_2(OCF(CF_3)CF_2)OCF(CF_3)COOH$, $CF_3(CF_2)_2(OCF_2CF_2)_4OCF(CF_3)COOH$, $Cf_3CF_2O(CF_2CF_2O)_3CF_2COOH$, and their salts.

Other emulsifiers include fluorosurfactants that are not carboxylic acids, such as for example, sulfinates or perfluoroaliphatic sulfinates or sulfonates. The sulfinate may have a formula Rf—$SO_2$M, where Rf is a perfluoroalkyl group or a perfluoroalkoxy group. The sulfinate may also have the formula Rf'—$(SO_2M)_n$ where Rf' is a polyvalent, preferably divalent, perfluoro radical and n is an integer from 2-4, preferably 2. Preferably the perfluoro radical is a perfluoroalkylene radical. Generally Rf and Rf' have 1 to 20 carbon atoms, preferably 4 to 10 carbon atoms. M is a cation having a valence of 1 (e.g. H+, Na+, K+, $NH_4$+, etc.). Specific examples of such fluorosurfactants include, but are not limited to $C_4F_9$—$SO_2$Na+, $C_6F_{13}$—$SO_2$Na; $C_8F_{17}SO_2$Na; $C_6F_{12}$—$(SO_2Na)_2$; and $C_3F_7$—O—$CF_2CF_2$—$SO_2$Na.

In one embodiment, the molecular weight of the anionic part of the fluorinated emulsifier, is less than 1500, 1000, or even 500 grams/mole.

In the art fluorinated emulsifiers have been added to the aqueous emulsion polymerization of fluoromonomers. Therefore, they are also referred to herein as "added fluorinated emulsifier".

The curable fluorinated polymers according to the present disclosure are essentially free of any added fluorinated emulsifiers, preferably they are free of any added fluorinated emulsifiers. This means no fluorinated emulsifiers have been added to the seed or to the subsequent polymerization or fluorinated emulsifiers have been added in an amount of less than 50 ppm based on the respective aqueous phase, or the fluorinated emulsifiers have been reduced to that amount before the polymerization to produce curable fluoropolymers is started. For example, the seed compositions may be subjected to an anion exchange treatment as known in the art to remove fluorinated emulsifiers. Therefore, the curable fluoropolymers are essentially free of added emulsifiers. "Essentially free" as used herein means no added fluorinated emulsifier or amounts of from >0 ppm and up to 5 ppm of added fluorinated emulsifier based on the aqueous phase in case of fluoropolymer dispersions or based on the total amount of fluoropolymer (solid content) in case of isolated fluoropolymers.

Emulsifiers are preferably added for the aqueous emulsion polymerization making the seed composition. The emulsifiers may be fluorinated emulsifier or non-fluorinated emulsifiers or a combination thereof. Preferably, no fluorinated emulsifiers are added. If fluorinated emulsifiers are added in the preparation of the seed composition, they may be added in an amount of less than 50 ppm based on then removed by anion-exchange to below 50 ppm.

The seed compositions preferably have a solid content of 0.05 to 5% by weight.

Methods of Making Curable Fluoropolymers

The curable fluoropolymers can be prepared by aqueous emulsion polymerization. The monomers are fed to reaction vessels and the reaction is carried out in the presence of an initiator for producing curable fluoropolymers. Further present are the one or more iodine-containing chain transfer agents and modifiers as described above. The monomers are those described above under the section "comonomers". The initiator for producing curable fluoropolymers and the iodine-containing chain transfer agents will be described in greater detail below.

In one embodiment the polymerization is conducted in the presence of one or more of the non-fluorinated emulsifiers as described above but not as a seed polymerization. The polymerization can be carried out as known in the art. The non-fluorinated emulsifier as described herein, or a mixture thereof (—also referred to herein above and below as "more than one emulsifier") may be added to the reaction mixture before the polymerization reaction is initiated or during the polymerization reaction of both, but preferably before the reaction is initiated.

In one embodiment a seed composition as described above is used to prepare the curable fluoropolymers. The seed composition may be generated in situ, which means the reaction is carried out as a quasi single step reaction. This means the seed composition is generated and then a dilution step may be carried out. The dilution may be carried to provide between 0.5 and 5% by weight of fluoropolymer seed particles based on the amount of aqueous phase to be used in the polymerization to produce the curable fluoropolymers. After the dilution the polymerization may be continued with the same monomers or with different monomers. After the dilution the polymerization may be carried out with the same initiators or different ones. The seed composition may also be prepared separately and may be subjected to a purification step (for example thermal treatment or ion-exchange treatment to remove initiators or fluorinated emulsifiers if present, as known in the art and described, for example, in WO 00/35971 and ion-exchange references cited therein, incorporated herein by reference) before being used in the polymerization to produce the curable fluoropolymers. The seed composition may have the same or a different comonomer composition as the comonomer composition used in the subsequent polymerization to produce the curable fluoropolymers. The seed composition may also be diluted or upconcentrated to the solid content desired in the subsequent polymerization. The seed composition described above may be pre-charged, meaning the monomers are added to the seed composition, or vice versa, the monomers may be pre-charged and the seed composition is added or some of the monomers are pre-charged and the seed composition is added together with monomers. Typically, the seed composition may be used in an amount of 0.01 up to 5%, preferably 0.5 to 4.5%, by weight of seed particles (solid content) based on the amount of aqueous phase used in the polymerization to produce curable fluoropolymers. The seed composition may be diluted for this purpose.

In case a seed composition is used, the polymerization to produce curable fluoropolymers can be carried out without adding any fluorinated or non-fluorinated emulsifiers, although the addition of further emulsifiers may not be detrimental to the polymerization but will of course increase the emulsifier content, which may be undesired. Preferably, the polymerization is carried out without adding any fluorinated or non-fluorinated emulsifiers.

The aqueous polymerization to prepare the curable fluoropolymers can be carried out as known in the art and involves reacting the comonomers, modifiers, including the cure site monomers if their presence is desired, in the presence of the iodine-containing chain transfer agents. Also present may be, for example, auxiliaries like buffers, other monomers and other cure-site monomers and other non-halogenated chain transfer agents such as but not limited to, ethers, alcohols and esters, in particular hydrocarbon ester (malonic acid esters), ethers (dimethyl ethers), alcohols (ethanol) and hydrocarbons like ethane.

Reaction Initiators for Producing Curable Fluoropolymers

The reaction initiator may be the same reaction initiators as described for making the seed composition or they may be different. For example, an inorganic initiator may be used to make the seed and an organic initiator may be used to produce the polymer or vice versa.

As reaction initiators standard initiator for the polymerization of fluoropolymers may be used, in particular standard initiators for aqueous emulsion polymerizations. Typically the initiators are compounds that decompose to produce free radicals under the reaction conditions. Examples include but are not limited to peroxo compounds. Specific examples of inorganic initiators include, but are not limited to, ammonium permanganate, potassium permanganate, potassium or ammonium sulfinate, ammonium peroxodisulfate, potassium peroxodisulfate or combination thereof. For the polymerization to produce curable fluoropolymers also organic peroxides, including but not limited to benzoyl peroxide, tert butyl hydroperoxides, tert, butyl pivalates may be used. To avoid generation of metal content which may be detrimental in some applications, ammonium salts may be used instead of alkali salts. Generally, the initiators may be used in a range of from about 0.001-about 0.2 weight % based on the total amount of comonomers.

Redox initiators may be used in combination with catalysts (e.g. heavy metal ions, for example copper ions and/or iron ions). In one embodiment the reaction initiator is a peroxodisulfate.

I-Containing Chain Transfer Agents

The polymerization according to the present disclosure is carried out in the presence of at least one chain transfer agent (CTA) containing iodine. Chain transfer agents are compounds capable of reacting with the propagating polymer chain and terminating the chain propagation. Examples of suitable chain transfer agents include those having the formula $RI_x$, wherein R is an x-valent fluoroalkyl or fluoroalkylene radical having from 1 to 12 carbon atoms, which, may or may not be interrupted by one or more ether oxygens and, optionally, may also contain chlorine and/or bromine atoms but preferably contains only fluorine and hydrogen atoms. Most preferably R is Rf and Rf is an x-valent (per)fluoroalkyl or (per)fluoroalkylen radical, optionally interrupted by one or more than one ether oxygens. Preferably R (and also Rf) has from 1 to 12 carbon atoms, preferably from 1 to 6 carbon atoms. Typically, 1 or 2. Specific examples include alpha-omega diiodo alkanes, alpha-omega diiodo fluoroalkanes, and alpha-omega diiodoperfluoroalkanes, which optionally may contain one or more catenary ether oxygens. "Alpha-omega" denotes that the iodine atoms are at the terminal positions of the molecules. Such compounds may be represented by the general formula X—R—Y with X and Y being I and R being as described above. Specific examples include di-iodomethane, alpha-omega (or 1,4-) diiodobutane, alpha-omega (or 1,3-) diiodopropane, alpha-omega (or 1,5-) diiodopentane, alpha-omega (or 1,6-) diiodohexane and 1,2-diiodoperfluoroethane. Other examples include fluorinated di-iodo ether compounds of the following formula:

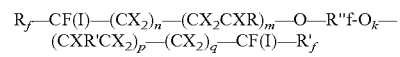

wherein X is independently selected from F, H, and Cl; $R_f$ and $R'_f$ are independently selected from F and a monovalent perfluoroalkane having 1-3 carbons; R is F, or a partially fluorinated or perfluorinated alkane comprising 1-3 carbons; $R''_f$ is a divalent fluoroalkylene having 1-5 carbons or a divalent fluorinated alkylene ether having 1-8 carbons and at least one ether linkage; k is 0 or 1; and n, m, and p are independently selected from an integer from 0-5 wherein, n plus m at least 1 and p plus q are at least 1.

Typically, the iodine containing chain transfer agents (I-CTA's) described above may be used in amounts of from about 0.001 to 5 weight %, preferably from about 0.1 to about 0.5% by weight based on the total amount of comonomers used in the polymerization.

In one embodiment, the total amount of the CTA may be pre-charged, i.e. may be added to the polymerization system prior to the polymerization. In one embodiment the total amount of the CTA is charged within 0.5 h from the beginning of the polymerization (i.e. from the moment at which the initiator is activated). In one embodiment of the present disclosure the CTA may be added in emulsified form or may be emulsified in the seed composition. Emulsification may be added by using heat or shear forces.

In addition to or as alternative to the halogenated chain transfer agents described above, iodine atoms can be introduced as end groups by using a suitable halogenated redox initiator system. Examples of useful halogenated redox initiator systems include a radical initiator and iodinated salts like but not limited to $I(CF_2)_nSO_2M$ with n=1 to 10. M represents a monovalent metal, such as, e.g., Na. Still further, the initiation and/or polymerization may be conducted in the presence of an iodine salt such as a metal or ammonium iodide, including for example potassium or sodium iodide to introduce iodine at a terminal carbon atom of the fluorinated polymer.

Cure Site Monomers (CSM)

The cure site monomers described above may be added to the polymerization. They may be added intermittently during the course of polymerization in undiluted form or alternatively diluted with monomers or in emulsified form using the non-fluorinated emulsifiers described above or other emulsifier. The CSMs can also be introduced into the kettle as an aerosol or sprayed into the kettle as fine droplets. Typical amounts of CSMs include amounts of from about 0.001 to 5 weight preferably from about 0.1 to about 1.5% by weight based on the total amount of monomers used.

Comonomers and Modifiers

The comonomers described above may be used in the amounts as described above. They may be added continuously or batchwise.

The modifiers as described above can be added before or during the polymerization. They may be added in amounts as described above, e.g. in amounts of greater than 0 and up to 1.4%, for example from about 0.1% to about 0.8% or from about 0.3% to about 0.6% by weight based on the total weight of the comonomers.

The polymerization temperature typically is in the range of about 50° C. to about 150° C., preferably from about and including 70° C. to about and including 90° C. The polymerization may be carried out continuously or batchwise. The polymerization may be carried out to generate multimodal or monomodal polymer populations. The polymerization may be run to generate core-shell particles or not to generate core-shell particles.

It has been found that the methods provided herein lead to an increased incorporation of iodine cure site end groups from the iodine-containing chain transfer agents described herein. This can be seen from the high ratio of iodine end groups versus hydroxyl end groups. For example the ratio at —$CH_2I$ groups versus —$CH_2OH$ groups in curable fluoropolymers obtained by the methods described herein may be at least 25 or at least 35. The I containing chain transfer agents lead to —$CH_2I$ end groups, in particular when partially fluorinated monomers are used, like VDF. The ratio of —$CH_2I$ to —$CH_2OH$ end groups is an indication of the incorporation of iodine into the polymer for a given polymer.

It is an advantage of the methods of the present disclosure that peroxide curable fluoropolymers with high —$CH_2I$ to $CH_2OH$ ratios can be generated. Another advantage of the present disclosure is that peroxide curable fluoropolymers with a rather small particle size can be generated. For example, fluoropolymer dispersion with particle sizes (Z-average) of from about 50 to about 300 nm, or from about 80 to 250 nm can be generated by the methods described herein. Such fluoropolymer dispersions are rather stable, which allows the polymerizations to be carried out to create fluoropolymers of high molecular weight.

Fluoroelastomer Compositions

The curable fluoropolymers obtainable by the methods described above may be used to make fluoroelastomer compositions. The resulting aqueous dispersions are typically treated to isolate the fluoroelastomer generated, for example by coagulation, which may be done mechanically by increasing shear force, by chilling out, or by salting out. The isolated fluoropolymer may then be washed several times with (distilled) water and dried. The curable fluoropolymer may be subjected to grinding or to melt-shaping, like pelletizing. The curable fluoropolymer may be mixed with one or more curing agents to yield a fluoroelastomer composition. Typically, the fluoroelastomer compositions are solid compositions. Typically, the contain the curable fluoropolymers and one or more peroxide cure systems. The peroxide cure systems typically include an organic peroxide. The peroxide will cause curing of the fluorinated polymer to form a cross-linked (cured) fluoropolymer when activated. Suitable organic peroxides are those which generate free radicals at curing temperatures. A dialkyl peroxide or a bis(dialkyl peroxide) which decomposes at a temperature above 50° C. is especially preferred. In many cases it is preferred to use a di-tertiarybutyl peroxide having a tertiary carbon atom attached to the peroxy oxygen. Among the most useful peroxides of this type are 2,5-dimethyl-2,5-di(tertiarybutylperoxy)hexyne-3 and 2,5-dimethyl-2,5-di(tertiarybutylperoxy)hexane. Other peroxides can be selected from compounds such as but not limited to dicumyl peroxide, dibenzoyl peroxide, tertiarybutyl perbenzoate, alpha,alpha'-bis(t-butylperoxy-diisopropylbenzene), and diisopropylbenzene), and di[1,3-dimethyl-3-(t-butylperoxy)-butyl]carbonate. Generally, about 1 to 5 parts of peroxide per 100 parts of fluoropolymer may be used.

The curing agents may be present on carriers, for example silica containing carriers. A peroxide cure system may also include one or more coagent. Typically, the coagent includes a polyunsaturated compound which is capable of cooperating with the peroxide to provide a useful cure. These coagents can be added in an amount between 0.1 and 10 parts per hundred parts fluoropolymer, preferably between 2 and 5 parts per hundred parts fluoropolymer. Examples of useful coagents include triallyl cyanurate; triallyl isocyanurate, triallyl trimellitate; tri(methylallyl)isocyanurate; tris(diallylamine)-s-triazine; triallyl phosphite; (N,N')-diallyl acrylamide; hexaallyl phosphoramide; (N,N,N,N)-tetraalkyl tetraphthalamide; (N,N,N',N-tetraallylmalonamide; trivinyl isocyanuate; 2,4,6-trivinyl methyltrisiloxane; N,N'-m-phenylenebismaleimide; diallyl-phthalate and tri(5-norbornene-2-methylene)cyanurate. Particularly useful is triallyl isocyunurate.

The curable fluoroelastomer composition may further contain acid acceptors. Such acid acceptors can be inorganic or blends of inorganic and organic acid acceptors. Examples of inorganic acceptors include magnesium oxide, lead oxide, calcium oxide, calcium hydroxide, dibasic lead phosphate, zinc oxide, barium carbonate, strontium hydroxide, calcium carbonate, hydrotalcite, etc. Organic acceptors include epoxies, sodium stearate, and magnesium oxalate. Particularly suitable acid acceptors include magnesium oxide and zinc oxide. Blends of acid acceptors may be used as well. The amount of acid acceptor will generally depend on the nature of the acid acceptor used. Typically, the amount of acid acceptor used is between 0.5 and 5 parts per 100 parts of fluorinated polymer.

The curable fluoroelastomer compositions may contain further additives, such as stabilizers, plasticizers, lubricants fillers, and processing aids typically utilized in fluoropolymer compounding, provided they have adequate stability for the intended service conditions. A particular example of additives includes carbon particles, like carbon black, graphite, soot.

The curable fluoroelastomer compositions may be prepared by mixing the fluorinated polymer, a peroxide cure composition and optionally additives in conventional rubber processing equipment to provide a solid mixture, i.e. a solid polymer containing the additional ingredients, also referred to in the art as a "compound". This process of mixing the ingredients to produce such a solid polymer composition containing other ingredients is typically called "compounding". Such equipment includes rubber mills, internal mixers, such as Banbury mixers, and mixing extruders. The temperature of the mixture during mixing typically will not rise above about 120° C. During mixing the components and additives are distributed uniformly throughout the resulting fluorinated polymer "compound" or polymer sheets. The "compound" can then be extruded or pressed in a mold. e.g., a cavity or a transfer mold and cured in the mold or transferred to an oven and subsequently be oven-cured. In an alternative embodiment curing can be done in an autoclave. Curing is typically achieved by heat-treating the curable fluoroelastomer composition. The heat-treatment is carried out at an effective temperature and effective time to create a cured fluoroelastomer. Optimum conditions can be tested by examining the fluoroelastomer for its mechanical and physical properties. Typically, curing is carried out at temperatures greater than 120° C. or greater than 150° C. Typical curing conditions include curing at temperatures between 160° C. and 210° C. or between 160° C. and 190° C. Typical curing periods include from 3 to 90 minutes. Curing is preferably carried out under pressure. For example pressures from 10 to 100 bar may be applied. A post curing cycle may be applied to ensure the curing process is fully completed. Post curing may be carried out at a temperature between 170° C. and 250° C. for a period of 1 to 24 hours.

The curable fluoropolymers provided herein may typically have an onset of cure (Ts2) of less than 1 minute at 180° C.

The method described above allows for the provision of cured fluoropolymers having good mechanical properties. The cured fluoroelastomers are the reaction product of the curable fluoropolymers described herein with a peroxide cure system. Such cross-linked polymers are obtainable by curing the curable fluoropolymers in the presence of a cure peroxide system. The resulting cured fluoroelastomers may have good mechanical properties which mean they may have one or more or all of the following properties;
(i) an elongation at break of at least 100%, preferably at least 150% or even at least 200%;
(ii) a tensile strength of at least 12 or at least 15 MPa, preferably at least 18 MPa;
(iii) a Shore A hardness of at least 30, preferably at least (typical embodiments have a tensile strength of at least 12 or at least 15 MPa, a Shore A hardness of at least 40 and an elongation at break of at least 160%);
(iv) a compression set of less than 25% (ASTM 395, method B, press curing at 40 bar for 7 minutes at 177° C. and post cure of 2 hours at 230° C.) and/or a VDA compression set of less than 45% (VDA 675218), curing for 22 hours at 150° C.;
(v) a [—$CF_2CH_2$—I]/[—$CF_2CH_2$—OH] molar ratio of at least 25.

The curable and cured fluoroelastomers may be used to prepare shaped articles. Such articles may be prepared by providing a curable fluoroelastomer composition and adding further ingredients such as filler, pigments, plasticizers, lubricants and the like to the curable composition. Typical fillers include, for example, silica containing materials or carbon particles like carbon blacks, graphite, soot and the like. Shaping the composition into a shaped article may be carried out, for example, by curing the composition in shaped molds or by shaping cured compositions by means known in the art, for example by cutting die cutting and the like.

The shaped articles include, for example, tubings, pipes, hoses, seals, stoppers, gaskets, flat seals, O-rings and the like. The articles may be used as components in combustion engines, vehicles driven by combustion engines, shaft seals or components thereof, seals or barrier materials or connectors of a chemical processing apparatus, in particular in oil and gas processing, such as storage and transportation containers, as components for compression or decompression devices or valves.

This disclosure will be further illustrated by the following examples and list of particular embodiments. These examples and embodiments are provided for illustrative purposes only and are not meant to limit the invention thereto. Unless specified otherwise, percentages by weight provided herein above and below will add up in each case to 100 weight percent in the final polymer or polymer composition as the case may be. When percentages of ingredients are given herein above and below in mole % weight % it is understood that the sum of all ingredients will add up to 100%—unless specified otherwise.

Examples and Test Methods

Test Methods
I-content:
The iodine content was determined by elemental analysis using an ASC-240 S auto sampler from Enviroscience (Düsseldorf/Germany), an Enviroscience AQF-2100 F combustion unit (software: "NSX-2100, version 1.9.8"; Mitsubishi Chemical Analytech Co., LTD.) an Enviroscience GA-210 gas absorbtion unit and a Metrohm "881 compac IC pro" liquid chromatography analyzer (software: Metrohm "Magic IC Net 2.3").

—$CF_2CH_2$I to —$CF_2CH_2$OH ratio:
The endgroup concentration ratio of [—$CF_2CH_2$—I]/[—$CF_2CH_2$—OH] was evaluated from the $^1$H nuclear magnetic resonance (NMR) spectra recorded with a Bruker Avarice 400 (400 MHz) instrument. The polymers were dissolved in acetone-$d_6$ at a concentration of typically 50 mg ml, 3000 scans per measurement were usually applied. Chemical shifts δ (delta) are reported using tetramethylsilane (TMS) as reference and in physical units of parts per million (ppm). The iodine containing polymers usually show well resolved signals in the $^1$H NMR spectrum. The signals in the chemical shift range of 4.10≥delta≥3.65 ppm are attributed to the protons of —$R_f$—$CF_2$—$CH_2$—I endgroups. Each signal for the protons of the —$R_f$—$CF_2$—$CH_2$—I groups splits into a triplet due to $^3J_{F-H}$ coupling (with 15 to 19 Hz), and their chemical shift delta is dependent on the penultimate monomer unit $R_f$. The triplet for the terminal protons in —$CF_2$—$CH_2$—$CF_2$—$CH_2$—I endgroups (VDF-VDF-1 end group) is one of the most prominent signals. It is centered at about delta=3.87±0.05 ppm ($δ_{ref}$). The triplet for the two methylene protons in —$CF_2$—$CH_2$—OH endgroups, is located at a position of 0.08 ppm+/−0.01 ppm to the right of $δ_{ref}$ (i.e., at delta=$δ_{ref}$-0.08 ppm+/− 0.01 ppm). The signal can further be identified by its coupling constant ($^3J_{F-H}$ about 13 Hz).

The signals of the —$R_f$—$CF_2$—$CH_2$—I groups are then integrated from an area starting at 0.20 ppm to the left of and $δ_{ref}$ and up to 0.07 ppm to the right of $δ_{ref}$ (i.e. at delta=$δ_{ref}$+ 0.20 ppm to $δ_{ref}$−0.07 ppm. For example, if $δ_{ref}$ is at 3.90 ppm the signals of the area starting at 4.1 ppm and up to 3.83 ppm are integrated). This area ($A_{CH2I}$) represents the concentration of -$CF_2CH_2$I endgroups.

The amount of —$CF_2CH_2$OH end groups is determined by integrating the area of the central signal of the —$CF_2$—$CH_2$—OH triplet ($A_{CH2OH}$). The areas of the two satellite signals surrounding the centers signal of the triplet are not included in the integration because they may (partially) overlap with signals from the —$CF_2CH_2I$ end groups. Therefore the integration of the main signal of the triplet only gives a half of the area of the signals for the —$CF_2CH_2OH$ methylene protons. Therefore, the ratio of [—$CF_2CH_2$—I]/[—$CF_2CH_2$—OH] end groups is calculated as:

$A_{CH2I}/2\ A_{CH2OH}$.

Glass Transition Temperature (Tg):

The Tg can be measured by differential scanning calometry, for example using a TA Instruments Q200 modulated DSC. Conditions of measurements were: heating rate from −150° C. to 50° C. at 2-3° C./minute. The modulation amplitude was +/− 1° C. per minute during 60 seconds.

Average Particle Size:

Seed Particles:

The seed particle size determination was conducted by dynamic light scattering according to ISO 13321 (21 CFR Part 11). Other than for the latex particle size determination, a Malvern Zefu Sizer Nano ZS equipped with a 50 mW laser operating at 532 nm was used for the analysis. 12 mm square glass cuvettes with round aperture and cap (Malvern model PCS 8501) were used to mount a sample volume of 1 ml. Since light scattering of surfactants is extremely sensitive to the presence of larger particles, e.g. dust particles, the presence of contaminants was minimized by thoroughly cleaning the cuvettes before the measurements. The cuvettes were washed with freshly-distilled acetone for 8 hours in a cuvette washing device. Dust discipline was also applied to the samples by centrifuging the surfactant solutions in a laboratory centrifuge at 14,500 g for 10 minutes prior to the measurements. The measuring device was operated at 25° C. in 173° backscattering mode. Low correlation times of $t<1^{-6}$ seconds were enabled by the research tool (the research tool is a software up-grade of the standard instrument provided by the supplier). In order to exploit the complete scattering ability of the sample volume, the attenuator 11 and a measurement position of 4.65 mm (center of the cell) was applied in all cases. Under these conditions, the baseline scattering of pure water (reference) is around 250 kcps. Each measurement consisting of 10 sub-runs was repeated for five times. The particle sizes are expressed as $D_{50}$ value.

Polymer Dispersions:

Average particle sizes of polymer particles as polymerized were determined by electronic light scattering in accordance with ISO 13321 using a Malvern Autosizer 2c. The average particle sizes are expressed as Z-average.

$$D_z = \frac{\sum S_i}{\sum (S_i/D_i)}$$

$S_i$ is the scattered intensity from particle i and $D_i$ is the diameter of particle i. For small particles, like particles below 1000 nm, Dz is assumed to correspond to the following equation:

$$D_z = \frac{\sum D_i^6}{\sum D_i^5}$$

Solid Content:

Solid content (fluoropolymer content) was determined gravimetrically according ISO 12086. A correction for non-volatile salts was not made.

Reduced Viscosity:

Solution viscosities of diluted polymer solutions were determined usually on a 0.16% polymer solution in methylethylketone (MEK) at 35° C. in accordance to DIN 53726. A *Connon-Fenske-Routine-Viskosimeter* (Fa. Schott, Mainz/Germany) fulfilling ISO/DIS 3105 and ASTM D 2515 was used for the measurements, the Hagenbach correcture was applied as usual.

Mooney Viscosity:

Mooney viscosities were determined in accordance with ASTM D1646-07(2012), 1 minute pre-heat and a 10 minute test at 121° C. (ML 1+10@121° C.

Polymer Composition:

$^{19}F$. nuclear magnetic resonance (NMR) spectra were recorded with a Bruker-Avance 400 (400.13 MHz) instrument. The polymers were dissolved in acetone-$d_6$ at a concentration of typically 50 mg/ml, 3000 scans per measurement were usually applied.

Hardness:

Hardness of samples can be measured according to ASTM D 2240-85 Method A with a Type A2 Shore Durometer. Units are reported in points on the Shore A scale.

Tear Strength:

Tensile Strength at Break, Elongation at Break, and Modulus at 100% Elongation can be determined using an Instron™ mechanical tester with a 1 kN load cell in accordance with DIN 53504 (S2 DIE). All tests are run at a constant cross head displacement rate of 200 mm/min.

Iodine Content Per Polymer Chain:

Molecular weight distributions (MVDs) were determined by means of Size Exclusion Chromatography (SEC) recorded in tetrahydrofuran (unstabilized HPLC grade from Chemsolute, >99.9%) at 40° C. and at a constant flow rate of 0.5 ml/min. The SEC equipment consisted of an Agilent 1260 LC system with PSS degasser, isocratic pump, autosampler, Agilent 1260 variable wavelength UV detector (Heilbronn/Germany), PSS column oven and a Shodex 101 RI detector. The sample concentration was typically kept at 5 mg/ml with an injection volume of 0.1 ml (0.5 mg injected mass). The separation was carried out using a PSS SDV precolumn (8×50 mm) and three PSS SDV 5µ columns 1000, 100,000, 10,000,000 Angström (8×300 mm). The SEC-elugrams were evaluated using WinGPC uniChrom software, Version 8.20 (PSS, Mainz/Germany). The molecular weight distributions were recorded relative to a calibration conducted with 13 narrow distributed polystyrene standard samples (PSS Polymer Standards Service, Mainz/Germany) ranging from 474 g/mol to 7,520,000 g/mol. These so-obtained relative molecular weights $M_1$ were converted to absolute molecular weights $M_2$ using the principle of universal calibration by the following equation:

$$1\ g\ M_2 = \frac{1}{1+\alpha_2} \cdot 1\ g\frac{K_1}{K_2} + \frac{1+\alpha_1}{1+\alpha_2} \cdot 1\ g\ M_1 \qquad \text{Equation 1}$$

Herein, the Mark-Houwink parameters $\alpha_1=0.706$ and $K_1=0.016$ for polystyrene and $\alpha_2=0.732$ and $K_2=8.983e{-}3$ for the fluoropolymer were applied. The so-obtained absolute molecular weight distributions (MWDs) of the polymers of the present invention may have a pronounced tailing in the high molecular mass regime which is believed to be caused by the presence of long chain branching. The MWDs can be approximated by the function below (equation 2):

$$w(1 \text{ g } M) = \sum_{n=1}^{10} \left( \exp(c_0 + c_1 \cdot n + c_2 \cdot n^2) \cdot \frac{\beta^k \cdot M^k \cdot \exp(-\beta \cdot M)}{\Gamma[k+1]} \right) \quad \text{Equation 2}$$

with $\beta = k / (2^n \cdot M_{N,0})$.

Equation 2 is a series expansion of in total 10 individual Schulz-Zimm distributions in a row, wherein 5 fit parameters are needed to express the MWD of the polymers. Herein, $M_{N,0}$ is the number average molecular mass of the first Schulz-Zimm distribution with n=1 (the first Schulz-Zimm distribution, the so-called "primary population"). This equation is equal Equation (6) in Auhl et al., Macromolecules 2006, Vol. 39, No. 6, p. 2316-2324). k is the degree of coupling, and $c_0$, $c_1$ and $c_2$ are the factors of the exponential pre-term. Further, $\Gamma[k+1]$ is the Gamma-function of [k+1] and n is an integer. A user defined fit routine operating under the software SigmaPlot 12.5 (Systat Software. Inc.; San Jose/Calif. USA) was used to determine the 5 fit parameters. With these 5 parameters reported in the following, the whole MWD including the pronounced tailing are sufficiently described. Equation 3 was used to evaluate the polydispersity index $M_w/M_N$:

$$M_W / M_N = \frac{\sum w_j M_j}{\sum w_j} \Big/ \frac{\sum w_j}{\sum (w_j / M_j)} \quad \text{Equation 3}$$

Thus, $w_j$ was calculated according to Equation 2, together with the 5 fitted parameters $M_{N,0}$, k, $c_0$, $c_1$ and $c_2$, in the data range for molecular weights of $1000 \leq M_2 \leq 100,000,000$ g/mol with a data resolution of 20 points per decade. The so-generated MWD was analyzed Equation 3 to give $M_W/M_N$, the results are also reported in the following.

In order to evaluate the number of iodine atoms per polymer chain, the Agilent 1260 variable wavelength UV detector was operated at a wavelength of $\lambda = 260$ nm. The further data analysis was conducted by means of the software module "Copolymer GPC Analyse mit Mehrfachdetektion", which is integrated into the WinGPC UniChrom software, Version 8.20 (PSS, Mainz/Germany). One thus obtains a signal response at $\lambda = 260$ nm of the SEC-slices, which, in the syntax of the software, equals to a "comonomer content".

The number of $-CF_2CH_2-I$ groups per polymer chain N, in the following reported as a dimensionless quantity, is then evaluated by the following equation.

$$N = \frac{\text{comonomer content} \times M_2}{F} \quad \text{Equation 4}$$

Herein, $M_2$ is absolute molecular weight by equation 1. The calibration factor F is specifically dependent on the UV detector that is used in the SEC-setup and thus, it needs to be determined on a suitable model substance which is bearing a known number of iodinated functionalities ($-CF_2CH_2I$ groups). In the present case, a low molecular weight polymer of linear chain topography was employed, that was synthesized by means of quasi-living iodine transfer polymerization. The preparation of this reference sample serving as calibration standard for the SEC-method is described in Example B1. The sample bears two $-CF_2CH_2-I$ groups per polymer chain and thus, a constant value of N is observed over a wide range of $M_2$ values. Consequently, the calibration factor F was adjusted in that way that at a value of N=2 was obtained for $M_2/M_{N,0}=0.1$, meaning at least 90% of the population has two iodine end groups per chain.

The polymers prepared according to the present methods have a specific shape for curves of N as a function of $M_2/M_{N,0}$. The slope of the curve of N as a function of $M_2/M_{N,0}$, herein referred as $dN/d(M_2/M_{N,0})$, is found to be capable to sufficiently quantify this characteristic of the curve of $N=f(M_2/M_{N,0})$ at high molecular masses. Curves obtained for polymers prepared according to present can be described by the following quantities: N at a value $M_2/M_{N,0}=1$, N at a value $M_2/M_{N,0}=0.1$, the value $M_2/M_{N,0}$ where N<2 and the value of $dN/d(M_2/M_{N,0})$ selected in the range $2 \leq M_2/M_{N,0} \leq 20$.

TABLE 1

Characteristic values of the polymerization examples measured by SEC chromatography.

| | Comp. Example 1 | Example 2 | Example 1 |
|---|---|---|---|
| $M_{N,0}$ [kg/mol] | 172.3 | 146.0 | 94.5 |
| K | 1.74 | 2.05 | 2.03 |
| $c_0$ | 7.473 | 7.812 | 7.604 |
| $c_1$ | 0.646 | 0.344 | 0.155 |
| $c_2$ | −0.0869 | −0.0172 | −0.0133 |
| $M_W/M_N$ | 5.3 | 10.1 | 7.1 |
| $N(M_2/M_{N,0} = 1)$ | 1.9 | 3.2 | 3.1 |
| $N(M_2/M_{N,0} = 0.1)$ | 0.3 | 2.8 | 2.0 |
| $M_2/M_{N,0}$ (N < 2) | 1.1 | 0.6 | 0.1 |
| $dN/d(M_2/M_{N,0})$ | 0.9 | 1.0 | 0.8 |

The table shows that compositions prepared by examples 1 and 2 have a more homogenous distribution of iodine end groups of lower and high molecular weight fractions of the polymer population ($N(M_2/M_{N,0}=0.1)$) of at least 2.0).

Curing:

For the curing test curable compositions were made on a two-roll mill by mixing 100 parts of fluorinated polymer, 30 parts of N-990 carbon black, 3 parts of acid acceptor (ZnO), 3 parts of Trigonox 101-50 pd, 4.3 parts of Luvomaxx TAIC DL 70. The curable composition was press-cured and then post cured.

Press-cure and Curing Properties:

Sample sheets measuring 100×150×2.0 mm can be prepared for physical property determination by pressing at about 40 bar for 7 minutes at 177° C. Post-Cure: press-cured samples were exposed to heat in air for 2 h at 250° C. The samples were returned to ambient temperature before testing. Curing properties were measured using a Monsanto Rheometer (at 177° C. in accordance with ASTM D 5289-93a), reporting minimum torque (ML) maximum torque (MH) and delta torque (which is the difference between MH and ML). Torque values are reported in an dNM. Also reported is tan delta @ MH. Further reported are parameters indicating the curing speed such as Ts2 (the time required to increase the torque by two units over the ML); Tc50 (the time to increase torque above ML by 50% of delta torque), and Tc90 (the time to increase torque above ML by 90% of delta torque), all of which are reported in minutes.

Compression Set and VDA Compression Set:

Compression set of test specimen were determined according to ASTM 395 Method B. Results are reported as a percentage of permanent set, and are measured at 25%. VDA compression set was measured according to norm VDA 675218.

Extractables:

For extraction analysis, 3.5 g of compounded and cured elastomer (prepared as above) was ground in a Spex 6770 cryogenic grinder (available from Metuchen, N.J./USA). 6 grinding cycles were applied within 30 minutes using liquid nitrogen as cooling agent. The ground polymer was blended with 6.5 g diatomaceous earth ("Kieselgur"), transferred into a 34 ml extraction cell, type K0987 from Thermo Fischer Scientific Inc., and placed into a Dionex ASE 150 solvent extractor (also available from Thermo Fischer Scientific Inc., Waltham, Mass./USA). The load of the extraction cell was extracted by 266 ml methylethylketone at 80° C. at a pressure of 119 bars in five cycles. The procedure was repeated three times. The four fractions obtained were combined and the methylethylketone was removed by evaporation (completed after no weight loss was observed anymore). Finally, the residual solid was weighted. The amount of extracted polymer is given as weight % (material extracted based on the total amount of material subjected to extraction).

EXAMPLES

Example 1

A 50 L-polymerization kettle was charged with 23.5 L of $H_2O$, 5 kg of seed and stirred at an agitator speed of 240 rpm. The kettle was heated up to 70° C. Then the following monomers were charged: PMVE until 5.7 bar was reached, VDF until pressure increased from 5.7 to 15.9 bar, TFE until pressure increased to 17.0 bar. The polymerization was initiated by adding 10 g of APS. Over 203 min. 5.2.5 kg of VDF, 0.90 kg of TFE, 3.35 kg of PMVE, 93 g of diiodo-perfluorobutane, 71 g of 1,1,2,2,3,3-hexafluoro-1,3-bis[(trifluoroethenyl)oxy]propane and 15 g of 1-iodoctafluorohexene were added continuously. The reaction was stopped. The resulting polymer dispersion had a solid content of 26 wt %. The average particle size of the polymer in the dispersion was 117 mm. The polymer was isolated by coagulation with $MgSO_4$. A Tg of −32° C. and a Mooney viscosity ML 1+10 of 23 was found. The molar composition was found to be 6 mol % TFE, 19 mol % PMVE and 75 mol % VDF. The iodine content was 0.51 wt % and the fluorine content was 63.9 wt %. The reduced viscosity was 95 mL/g. The ratio of —$CH_2$—I to —$CH_2$—OH groups was 45. The seed composition used had a solid content of 1.1 wt % a pH of 4.3 and the average particle size (D50) was 38 nm. The seed was prepared by polymerizing VDF, TFE, HFP (40 g/120 g/39 g) in radical aqueous emulsion polymerization using Glucopon 600 (CSUP as emulsifier.

Example 2

A 50 L-polymerization kettle was charged with 23.5 L of $H_2O$, 5 kg of seed (as used in Example 1) and stirred at an agitator speed of 240 rpm. The kettle was heated up to 70° C. Then the following monomers were charged: PMVE until 5.7 bar was reached, VDF until pressure increased from 5.7 to 15.9 bar, TFE until pressure increased to 17.0 bar. The polymerization was initiated by adding 7 g of APS. Over 260 min, 5.25 kg of VDF, 0.90 kg of TFE, 3.35 kg of PMVE, 40 g of diiodo-perfluorobutane, 36 g of 1,1,2,2,3,3-hexafluoro-1,3-bis[(trifluoroethenyl)oxy]propane and 25 g of 1-iodoctafluorohexene were added continuously. The reaction was stopped. The resulting polymer dispersion had a solid content of 26 wt %. The average particle size of the polymer in the dispersion was 121 nm. The polymer was isolated by coagulation with $MgSO_4$. A $T_g$ of −32° C. and a Mooney viscosity ML 1+10 of 49 was found. The molar composition was found to be 7 mol % TFE, 18 mol % PMVE and 75 mol % VDF. The iodine content was 0.30 wt % and the fluorine content was 64.0 wt %. The reduced viscosity was 112 mL/g. The ratio of —$CH_2$—I to —$CH_2$—OH groups was 65.

Example 3

A 50 L-polymerization kettle was charged with 23.5 L of $H_2O$, 5 kg of seed and stirred at an agitator speed of 240 rpm. The kettle was heated up to 70° C. Then the following monomers were charged: HFP until 12.3 bar was reached, VDF until pressure increased from 12.3 to 15.0 bar, TFE until pressure increased to 17.0 bar. The polymerization was initiated by adding 10 g of APS. Over 428 min, 3.14 kg of VDF, 2.49 kg of TFE, 3.69 kg of HFP, 51 g of diiodo-perfluorobutane, 44 g of 1,1,2,2,3,3-hexafluoro-1,3-bis[(trifluoroethenyl)oxy]propane and 30 g of 1-iodoctafluorohexene were added continuously. The reaction was stopped. The resulting polymer dispersion had a solid content of 24 wt %. The average particle size of the polymer in the dispersion was 100 nm. The polymer was isolated by coagulation with $MgSO_4$. A $T_g$ of −6° C. and a Mooney viscosity ML 1+10 of 54 was found. The molar composition was found to be 25 mol % TFE, 23 mol % HFP and 52 mol % VDF. The iodine content was 0.38 wt % and the fluorine content was 70.0 wt %. The reduced viscosity was 55 mL/g. The ratio of —$CH_2$—I to —$CH_2$—OH groups was 70. The seed composition used had a solid content of 1.0 wt % a pH of 3.5 and the average particle size (D50) was 18 nm. The seed was prepared by polymerizing VDF, TFE, HFP (40 g/120 g/39 g) in radical aqueous emulsion polymerization using GENAPOL LRO as emulsifier.

Comparative Example 1

A 50 L-polymerization kettle was charged with 23.5 L of $H_2O$ and stirred at an agitator speed of 240 rpm. The kettle was heated up to 70° C. Then the following monomers were charged: PMVE until 5.4 bar was reached, VDF until pressure increased from 5.4 to 15.0 bar, TFE until pressure increased to 16.0 bar. The polymerization was initiated by adding 20 g of APS. Over 147 min, 5.25 kg of VDF, 0.90 kg of TFE, 3.35 kg of PMVE, 40 g of diiodo-perfluorobutane and 0 g of 1,1,2,2,3,3,-1,3-bis[(trifluoroethenyl)oxy]propane were added continuously. The reaction was stopped. The resulting polymer dispersion had a solid content of 29 wt %. The average particle size of the polymer in the dispersion was 353 nm. The polymer was isolated by coagulation with $MgSO_4$. A $T_g$ of −33° C. and a Mooney viscosity ML 1+10 of 56 was found. The molar composition was found to be 8 mol % TFE, 18 mol % PMVE and 74 mol % VDF. The iodine content was 0.19 wt % and the fluorine content was 64.2 wt %. The reduced viscosity was 98 mL/g. The ratio of —$CH_2$—I to —$CH_2$—OH groups was 12.

Curing Properties

The curable polymers obtained in examples 1, 2 and comparative example 1 were compounded to contain a curing system and subjected to curing. The physical properties of the cured samples were measured after post cure and shown in the table below. Compositions according to examples 1 and 2 can be easier removed from the mold than those according to comparative example 1 and leave fewer residues on the mold.

TABLE 2

Curing properties:

|  | Example 1 | Example 2 | Example 3 | Comp. Example 1 |
|---|---|---|---|---|
| Monsanto MDR 7 min @ 177° C. | | | | |
| ML (dNm) | 0.6 | 1.8 | 1.57 | 1.8 |
| MH (dNm) | 29.6 | 26.1 | 27.6 | 22.9 |
| MH – ML (dNm) | 28.9 | 24.4 | 26.1 | 21.1 |
| Tan delta @ MH | 0.049 | 0.057 | 0.056 | 0.073 |
| Ts2 (min.) | 0.40 | 0.38 | 0.39 | 0.40 |
| Tc50 (min.) | 0.53 | 0.52 | 0.56 | 0.60 |
| Tc90 (min.) | 0.72 | 0.73 | 0.83 | 1.00 |
| Post cure 2 h @ 230° C. | | | | |
| Hardness Shore A | 75 | 69 | 74 | 69 |
| Modulus 100% (MPa) | 8.6 | 4.9 | 6.3 | 3.7 |
| Tensile (MPa) | 13.5 | 22.1 | 22.7 | 20.6 |
| Elongation (%) | 129 | 237 | 223 | 252 |
| Compression Set Buttons 70 h @ 200° C. | | | | |
| Press cure 7 min @ 177° C. | 15 | 21 | 20 | 30 |
| Post cure 2 h @ 230° C. | 12 | 18 | 17 | 27 |
| VDA Compression Set | | | | |
| CS 22 h @ 150° C. | 22 | 32 | 38 | 51 |
| Extractables wt % (extracted material based on total material subjected to extraction) | 1.76 | 2.47 | 1.54 | 4.11 |

List of Particular Embodiments

The following list of embodiments if provided to further illustrate the present disclosure but without intending to limit the disclosure to the specific embodiments listed.
1. A curable fluoropolymer containing repeating units derived from VDF and TFE and at least one other fluorinated comonomer and further containing —CF$_2$CH$_2$I end groups and branching sites derived from one or more perfluorinated bisolefinic ether modifier, wherein the polymer is obtainable by an aqueous emulsion polymerization comprising the addition of one or more than one non-fluorinated emulsifier but wherein essentially no fluorinated emulsifier is added and wherein the one or more perfluorinated bisolefinic ether modifier correspond to the general formula:

CF$_2$=CF—(CF$_2$)$_n$—O—(R$_f$)—O—(CF$_2$)$_m$—CF=CF$_2$ wherein n and m are independent from each other either 1 or 0 and wherein R$_f$ represents a perfluorinated linear or branched, cyclic or acyclic aliphatic or aromatic hydrocarbon residue that may be interrupted by one or more oxygen atoms and comprises up to 30 carbon atoms.
2. The curable fluoropolymer of 1 having a molar —CH$_2$I to —CH$_2$OH ratio of at least 30.
3. The curable fluoropolymer of any one of the preceding embodiments wherein a seed composition is used for the aqueous emulsion polymerization to produce the curable fluoropolymer and wherein the seed composition is obtainable by aqueous emulsion polymerization of fluorinated monomers and wherein the non-fluorinated emulsifier is added in the preparation of the seed composition, for example before the polymerization is initiated.
4. The curable fluoropolymer according to anyone of the preceding embodiments wherein the amount of the perfluorinated bisolefinic ether modifier used is less than 0.95% by weight based on the total weight of the monomers.
5. The curable fluoropolymer according to any one of the preceding embodiments wherein the modifiers are selected from ethers according to the general formula:

CF$_2$=CF—(CF$_2$)$_n$—O—(CF$_2$)$_p$—O—(CF$_2$)$_m$—CF=CF$_2$ wherein n and m are independent from each other either 1 or 0 and p is an integer from 1 to 10, preferably from 3, 5, or 7, more preferably 3.
6. The curable fluoropolymer according to any one of the preceding embodiments further having a compression set (ASTM 395, method B) of less than 25% after press curing at 40 bar and 177° C. for 7 minutes and post curing at 230° C. for 2 hours.
7. The curable fluoropolymer according to any one of the preceding embodiments having less than 4.0% wt of extractable material alter curing and based on the total amount of cured fluoropolymer subjected to the extraction.
8. The curable fluoropolymer according to any one of the preceding embodiments further having units derived from a cure site monomer selected from fluorinated iodo-olefins of the general formula:

Z'—(R$_f$)—CX=CX$_2$ wherein each X independently represents H or F, Z' is r I, Rf is a C$_1$-C$_{12}$ fluoro- or perfluoroalkylene, which optionally may be interrupted by one or more than one ether atom, optionally containing chlorine atoms and or ether atoms; or selected from the general formula:

R$_f$—(CF(I)—(CX$_2$)$_n$—(CX$_2$CXR)$_m$—O—R"f-O$_x$—(CXR'CX$_2$)$_p$—(CX$_2$)$_q$—CF(I)—R'$_r$ wherein X is independently selected from F, H and Cl; R$_r$ and R'$_r$ are independently selected from F and a monovalent perfluoroalkane having 1-3 carbons; R is F, or a partially fluorinated or perfluorinated alkane comprising 1-3 carbons; R"$_r$ is a divalent fluoroalkylene having 1-5 carbons or a divalent fluorinated alkylene ether having 1-8 carbons and at least one ether linkage; k is 0 or 1; and n, m, and p are independently selected from an integer from 0-5, wherein, n plus m at least 1 and p plus q are at least 1.
9. The curable fluoropolymer according to any one of the preceding embodiments further having a reduced viscosity of from 20 mL/g to about 180 mL/g.
10. The curable fluoropolymer according to any one of the preceding embodiments wherein the seed composition is obtained by the aqueous emulsion polymerization involving polymerizing fluorinated monomers in the presence of one or more non-fluorinated saturated emulsifiers and wherein the monomers are selected from VDF, TFE and at least one other fluorinated comonomer.
11. The curable fluoropolymer according to any one of the preceding embodiments wherein the comonomers are selected to yield a polymer having a fluorine content of at least 58% by weight (wt. %) based on the total weight of the fluoropolymer and excluding the contribution to the fluorine content of ingredients other than comonomers.
12. The curable fluoropolymer according to any one or the preceding claims wherein the non-fluorinated emulsifiers is selected from aliphatic hydrocarbon sulfate or sulfonate emulsifiers, wherein the hydrocarbon part contains one or more oxygen containing moieties and wherein the sulfates or sulfonate emulsifiers may contain one or more than one sulfate or sulfonate groups.

13. The curable fluoropolymer according to any one of the preceding claims wherein the non-fluorinated emulsifiers is selected from aliphatic hydrocarbon sulfate or sulfonate emulsifiers, wherein the sulfates or sulfonate emulsifiers may contain one or more than one sulfate or sulfonate groups and wherein the hydrocarbon part contains one or more oxygen containing moieties selected from alkyl ether groups, poly ether alkyl groups, carboxylate ester (—O—C(=O)—) groups, carboxamide (—NYX—C(=O)— groups and combinations thereof, wherein Y and X may be H, or an alkyl groups, preferably a methyl or ethyl group and combinations thereof.

14. The curable fluoropolymer according to any one of the preceding claims wherein the non-fluorinated emulsifier is selected from hydrocarbon sulfates or sulfinates wherein the hydrocarbon part may be substituted by one more catenary oxygen atoms, e.g. the hydrocarbon part is an ether or polyether residue.

15. A cured composition obtained after subjecting the curable fluoropolymer according to any one of the preceding embodiments to a curing reaction.

16. An article comprising the cured composition of any embodiment 15.

17. Method of making an article comprising subjecting the curable polymer composition according to any one of embodiments 1 to 14 to curing and shaping wherein the shaping may occur after or during the curing.

18. Method of making a curable fluoropolymer comprising polymerizing VDF, TFE and at least one other comonomer in an aqueous emulsion polymerization in the absence of any added fluorinated emulsifiers but in the presence of one or more non-fluorinated emulsifiers, one or more odine-containing chain transfer agent (CTA), one or more perfluorinated bisolefinic ether modifier(s) and, optionally, one or more iodine-containing cures site monomers, wherein the iodine-containing CTA is selected from fluorinated iodoolefins wherein the olefin chain may be interrupted once or more than once by an ether oxygen, and wherein the modifier is selected from perfluorinated bisolefinic ether modifiers corresponding to the general formula:

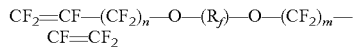

wherein n and m are independent from each other either 1 or 0 and wherein $R_f$ represents a perfluorinated linear or branched, cyclic or acyclic aliphatic or aromatic hydrocarbon residue that may be interrupted by one or more oxygen atoms and comprises up to 30 carbon atoms.

19. Method of making a curable fluoropolymer comprising
i) providing a seed composition obtained by aqueous emulsion polymerization of one fluorinated monomer and at least one other fluorinated comonomer essentially in the absence of a fluorinated emulsifier but in the presence of one or more than one non-fluorinated saturated emulsifiers;
ii) polymerizing VDF, TFE and at least one other comonomer in an aqueous emulsion polymerization in the presence of the seed composition and in the absence of any added fluorinated emulsifiers but in the presence of an iodine-containing chain transfer agent (CTA), one or more perfluorinated bisolefinic ether modifier(s) and, optionally, one or more iodine-containing cures site monomers wherein the iodine-containing CTA is selected from fluorinated iodoolefins wherein the olefin chain may be interrupted once or more than once by an ether oxygen, and wherein the modifier is selected from perfluorinated bisolefinic ether modifier corresponding to the general formula:

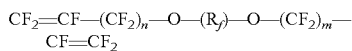

wherein n and m are independent from each other either 1 or 0 and wherein $R_f$ represents a perfluorinated linear or branched, cyclic or acyclic aliphatic or aromatic hydrocarbon residue that may be interrupted by one or more oxygen atoms and comprises up to 30 carbon atoms.

20. The method of embodiment 19, wherein step (ii) is carried out without adding any non-fluorinated emulsifier.

21. The method of embodiment 19 or 20 wherein the comonomers used in step i) contain a partially fluorinated comonomer, preferably VDF.

22. The method of any one of embodiments 19 to 21 wherein the comonomers used in step i) contain partially fluorinated comonomer selected from VDF and a perfluorinated comonomer selected from HFP and TFE or a combination thereof.

23. The method according to any one of embodiments 19 to 21 wherein no fluorinated emulsifier is added in step i).

24. The method according to any one of embodiments 19 to 23 wherein the fluoropolymer seed particles of the seed composition have a particle size $D_{50}$ of up to about 51 nm, preferably from 5 to 50 nm, more preferably from 15 to 25 nm.

25. The method according to any one of embodiments 19 to 24 wherein the fluoropolymer seed particles of the seed composition have a particle size $D_{50}$ of up to about 51 nm, preferably from 5 to 50 nm, more preferably from 15 to 25 nm and wherein the seed composition has a polymer (solid) content of 0.05 to 5% wt based on the aqueous phase.

26. The method according to any one of embodiments 19 to 25 wherein the content of seed particles (solid content) used in step ii) is from 0.01 to 2% wt. based on the aqueous phase used in step ii).

27a. The method according to any one of embodiments 18 to 26 wherein the non-fluorinated saturated emulsifier is non-ionic.

27b. The method according to any one of embodiments 15 to 26 wherein the non-fluorinated saturated emulsifier is anionic.

28. The method according to embodiment 27b wherein the non-fluorinated emulsifiers is selected from aliphatic hydrocarbon sulfate or sulfonate emulsifiers, wherein the hydrocarbon part contains one or more oxygen containing moieties and wherein the sulfates or sulfonate emulsifiers may contain one or more than one sulfate or sulfonate groups.

29. The method according to embodiment 27b wherein the non-fluorinated emulsifiers is selected from aliphatic hydrocarbon sulfate or sulfonate emulsifiers, wherein the sulfates or sulfonate emulsifiers may contain one or more than one sulfate or sulfonate groups and wherein the hydrocarbon part contains one or more oxygen containing moieties selected from alkyl ether groups, poly ether alkyl groups, carboxylate ester (—O—C(=O)—) groups, carboxamide (—NYX—C(=O)— groups and combinations thereof, wherein Y and X may be H, or an alkyl groups, preferably a methyl or ethyl group and combinations thereof.

30. The method according to embodiment 27b wherein the non-fluorinated emulsifier is selected from hydrocarbon sulfates or sulfonates wherein the hydrocarbon part may be substituted by one or more catenary oxygen atoms, e.g. the hydrocarbon part is an ether or polyether residue.

31. The method according to any one of the preceding embodiments 18 to 30 wherein the modifiers are selected from ethers according to the general formula:

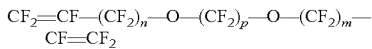

wherein n and m are independent from each other either 1 or 0 and p is an integer from 1 to 10.

32. The method according to any one of the preceding embodiments 18 to 31 wherein the modifiers are selected from ethers according to the general formula:

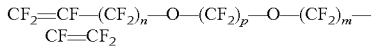

wherein n and m are independent from each other either 1 or 0 and p is an integer selected from 3, 5 and 7.

33. The method according to any one of embodiments 18 to 32 wherein the amount of perfluorinated bisolefinic ether modifiers used is less than 0.95% by weight based on the total weight of the monomers.

34. The method according to anyone of embodiments 18 to 33 wherein the curable fluoropolymer polymer has a molar —$CH_2I$ to —$CH_2OH$ ratio of at least 30.

35. The method according to any one of embodiments 18 to 34 wherein the curable fluoropolymer has a compression set (ASTM 395, method B) of less than 25% after press curing at 40 bar and 177° C. for 7 minutes and post curing at 230° C. for 2 hours.

36. The method according to any one of embodiments 18 to 35 wherein the curable fluoropolymer has less than 4.0% wt of extractable material after curing based on the total amount of cured fluoropolymer subjected to the extraction.

37. The method according to any one of embodiments 18 to 36 wherein a cure site monomer monomer is used in step ii) that is selected from fluorinated iodo-olefins of the general formula:

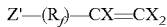

wherein each X independently represents H or F, preferably H, Z' is I, Rf is a $C_1$-$C_{12}$ fluoro- or perfluoroalkylene, which optionally may be interrupted by one or more than one ether atom, optionally containing chlorine atoms and or ether atoms.

38. The method according to any one of embodiments 18 to 37 wherein the cure site is selected from the general formula:

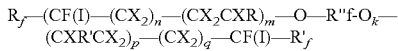

wherein X is independently selected from F, H, and Cl; $R_f$ and $R'_f$ are independently selected from F and a monovalent perfluoroalkane having 1-3 carbons; R is F, or a partially fluorinated or perfluorinated alkane comprising 1-3 carbons; $R''_f$ is a divalent fluoroalkylene having 1-5 carbons or a divalent fluorinated alkylene ether having 1-8 carbons and at least one ether linkage; k is 0 or 1; and n, m, and p are independently selected from an integer from 0-5, wherein, n plus m at least 1 and p plus q are at least 1.

39. The method according to any one of embodiments 18 to 38 wherein the curable fluoropolymer further has a reduced viscosity of from 20 mL/g to about 180 mL/g.

40. The method according to any one of embodiments 18 to 39 wherein the comonomers are selected to yield a polymer having a fluorine content of at least 58% wt based on the total weight of the fluoropolymer and excluding the contribution to the fluorine content of ingredients other than comonomers.

41. A curable fluoropolymer obtainable by the method according to any one of embodiments 18 to 40, optionally further comprising isolating the polymer from the dispersion, drying and washing and sizing, for example grinding or melt-shaping like pelletizing.

The invention claimed is:

1. A curable fluoropolymer containing repeating units derived from vinylidene fluoride (VDF) and tetrafluoroethylene (TFE) and at least one other fluorinated comonomer and further containing (i) —$CF_2CH_2I$ end groups and (ii) branching sites derived from one or more perfluorinated bisolefinic ether modifier;
wherein the polymer is obtained by an aqueous emulsion polymerization comprising the addition of one or more non-fluorinated emulsifier but wherein essentially no fluorinated emulsifier is added; and
wherein the one or more perfluorinated bisolefinic ether modifier correspond to the general formula:

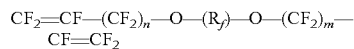

wherein n and m are independent from each other either 1 or 0 and wherein $R_f$ represents a perfluorinated linear or branched, cyclic or acyclic aliphatic or aromatic hydrocarbon residue that may be interrupted by one or more oxygen atoms and comprises up to 30 carbon atoms.

2. The curable fluoropolymer of claim 1 having a molar —$CH_2I$ to —$CH_2OH$ ratio of at least 30.

3. The curable fluoropolymer of claim 1 wherein a seed composition is used for the aqueous emulsion polymerization to produce the curable fluoropolymer and wherein the seed composition is obtained by aqueous emulsion polymerization of fluorinated monomers and wherein the non-fluorinated emulsifier is added to prepare the seed composition.

4. The curable fluoropolymer according to claim 1, wherein the amount of the perfluorinated bisolefinic ether modifiers used is less than 0.95% by weight based on the total weight of the monomers.

5. The curable fluoropolymer according to claim 1, wherein the modifiers are selected from ethers according to the general formula:

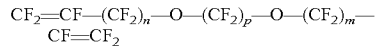

wherein n and m are independent from each other either 1 or 0 and p is an integer from 1 to 10.

6. The curable fluoropolymer according to claim 1, wherein the modifiers are selected from ethers according to the general formula:

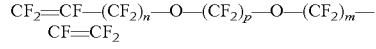

wherein n and m are independent from each other either 1 or 0 and p is an integer selected from 3, 5 and 7.

7. The curable fluoropolymer according to claim 1, further having a compression set (ASTM 395, method B) of less than 25% after press curing at 40 bar and 177° C. for 7 minutes and post curing at 230° C. for 2 hours.

8. The curable fluoropolymer according to claim 1, having less than 4.0 wt % of extractable material after curing based on the total amount of cured polymer subjected to extraction.

9. The curable fluoropolymer according to claim 1, further having units derived from a cure site monomer selected from fluorinated iodo-olefins of the general formula:

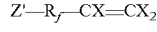

wherein each X independently represents H or F, preferably H, Z' is I, Rf is a $C_1$-$C_{12}$ fluoro- or perfluoroalkylene, which optionally may be interrupted by one or more than one ether atom, optionally containing chlorine atoms and/or ether atoms.

10. A curable fluoropolymer containing repeating units derived from vinylidene fluoride (VDF) and tetrafluoroethylene (TFE) and at least one other fluorinated comonomer and further containing (i) —CF$_2$CH$_2$I end groups and (ii) branching sites derived from one or more perfluorinated bisolefinic ether modifier;
wherein the polymer is obtained by an aqueous emulsion polymerization comprising the addition of one or more non-fluorinated emulsifier but wherein essentially no fluorinated emulsifier is added; and
wherein the one or more perfluorinated bisolefinic ether modifier correspond to the general formula:

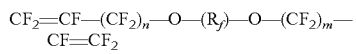

wherein n and m are independent from each other either 1 or 0 and wherein R$_f$ represents a perfluorinated linear or branched, cyclic or acyclic aliphatic or aromatic hydrocarbon residue that may be interrupted by one or more oxygen atoms and comprises up to 30 carbon atoms, the curable fluoropolymer further having units derived from a cure site monomer selected from the general formula:

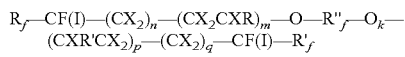

wherein X is independently selected from F, H, and Cl; R$_f$ and R'$_f$ are independently selected from F and a monovalent perfluoroalkane having 1-3 carbons; R is F, or a partially fluorinated or perfluorinated alkane comprising 1-3 carbons; R"$_f$ is a divalent fluoroalkylene having 1-5 carbons or a divalent fluorinated alkylene ether having 1-8 carbons and at least one ether linkage; k is 0 or 1; and n, m, and p are independently selected from an integer from 0-5, wherein, n plus m is at least 1 and p plus q is at least 1.

11. The curable fluoropolymer according to claim 1, further having a reduced viscosity of from 20 mL/g to about 180 mL/g.

12. The curable fluoropolymer according to claim 3, wherein the seed composition is obtained by the aqueous emulsion polymerization involving polymerizing fluorinated monomers in the presence of one or more non-fluorinated saturated emulsifiers and wherein the monomers are selected from VDF, TFE and at least one other fluorinated comonomer.

13. The curable fluoropolymer according to claim 1, wherein the non-fluorinated emulsifiers are selected from aliphatic hydrocarbon sulfate or sulfonate emulsifiers, wherein the hydrocarbon part contains one or more oxygen containing moieties and wherein the sulfate or sulfonate emulsifiers may contain one or more than one sulfate or sulfonate groups.

14. The curable fluoropolymer according to claim 1, wherein the non-fluorinated emulsifiers are selected from aliphatic hydrocarbon sulfate or sulfonate emulsifiers, wherein the sulfate or sulfonate emulsifiers may contain one or more than one sulfate or sulfonate groups and wherein the hydrocarbon part contains one or more oxygen containing moieties selected from alkyl ether groups, poly ether alkyl groups, carboxylate ester (—O—C(═O)—) groups, carboxamide (—NYX—C(═O)— groups and combinations thereof, wherein Y and X may be H, or an alkyl group and combinations thereof.

15. The curable fluoropolymer according to claim 1, wherein the non-fluorinated emulsifier is selected from hydrocarbon sulfates or sulfonates wherein the hydrocarbon part may be substituted by one or more catenary oxygen atoms.

16. A cured composition obtained after subjecting the curable fluoropolymer according to claim 1, to a curing reaction.

17. An article comprising the cured composition of claim 16.

18. Method of making an article comprising subjecting the curable polymer composition according to claim 1, to curing and shaping wherein the shaping may occur after or during the curing.

19. Method of making a curable fluoropolymer comprising i) polymerizing VDF, TFE and at least one other comonomer in an aqueous emulsion polymerization in the absence of any added fluorinated emulsifiers but in the presence of a non-fluorinated emulsifier, an iodine-containing chain transfer agent (CTA), one or more perfluorinated bisolefinic ether modifier(s) and, optionally, one or more iodine-containing cures site monomers, wherein the iodine-containing CTA is selected from fluorinated iodo-olefins wherein the olefin chain may be interrupted once or more than once by an ether oxygen, and wherein the modifier is selected from perfluorinated bisolefinic ether modifiers corresponding to the general formula:

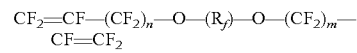

wherein n and m are independent from each other either 1 or 0 and wherein R$_f$ represents a perfluorinated linear or branched, cyclic or acyclic aliphatic or aromatic hydrocarbon residue that may be interrupted by one or more oxygen atoms and comprises up to 30 carbon atoms;
wherein the curable fluoropolymer contains (i) —CF$_2$CH$_2$I end groups and (ii) branching sites derived from the one or more perfluorinated bisolefinic ether modifier(s).

20. Method of making a curable fluoropolymer comprising
i) providing a seed composition obtained by aqueous emulsion polymerization of one fluorinated monomer and at least one other fluorinated comonomer essentially in the absence of a fluorinated emulsifier but in the presence of one or more non-fluorinated saturated emulsifier;
ii) polymerizing VDF, TFE and at least one other comonomer in an aqueous emulsion polymerization the presence of the seed composition and in the absence of any added fluorinated emulsifiers but in the presence of an iodine-containing chain transfer agent (CTA), one or more perfluorinated bisolefinic ether modifier(s) and, optionally, one or more iodine-containing cures site monomers, wherein the iodine-containing CTA is selected from fluorinated iodo-olefins wherein the olefin chain may be interrupted once or more than once by an ether oxygen, and wherein the modifier is selected from perfluorinated bisolefinic ether modifiers corresponding to the general formula:

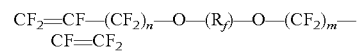

wherein n and m are independent from each other either 1 or 0 and wherein R$_f$ represents a perfluorinated linear or branched, cyclic or acyclic aliphatic or aromatic hydrocarbon residue that may be interrupted by one or more oxygen atoms and comprises up to 30 carbon atoms;

wherein the curable fluoropolymer contains (i) —CF$_2$CH$_2$I end groups and (ii) branching sites derived from the one or more perfluorinated bisolefinic ether modifier(s).

* * * * *

UNITED STATES PATENT AND TRADEMARK OFFICE
CERTIFICATE OF CORRECTION

Page 1 of 1

PATENT NO. : 10,875,948 B2
APPLICATION NO. : 15/553101
DATED : December 29, 2020
INVENTOR(S) : Florian Jochum It is certified that error appears in the above-identified patent and that said Letters Patent is hereby corrected as shown below:

In the Specification

Column 7
Line 33-34, Delete "$(CF_2)_n$" and insert -- $(CF_2)_p$ --, therefor.

Column 8
Line 62, Delete "1-" and insert -- I- --, therefor.

Column 14
Line 6, Delete "(—N(R)~)" and insert -- (—N(R)—) --, therefor.

Column 16
Line 6, Delete "—CH2OH)—(CHOH)n-1—CH2OH;" and insert -- —CH(CH2OH)—(CHOH)n-1—CH2OH; --, therefor.

Column 30
Line 35 (Approx.), Delete "(MVDs)" and insert -- (MWDs) --, therefor.

Column 39
Line 46, Delete "(CF(I)" and insert -- CF(I) --, therefor.

Signed and Sealed this
Twenty-seventh Day of July, 2021

Drew Hirshfeld
*Performing the Functions and Duties of the*
*Under Secretary of Commerce for Intellectual Property and*
*Director of the United States Patent and Trademark Office*